United States Patent
Kolste et al.

(10) Patent No.: US 12,460,674 B2
(45) Date of Patent: Nov. 4, 2025

(54) BEARING ASSEMBLIES, BEARING APPARATUSES, AND RELATED METHODS

(71) Applicant: US Synthetic Corporation, Orem, UT (US)

(72) Inventors: Tyler E. Kolste, American Fork, UT (US); S. Barrett Peterson, Orem, UT (US); Jair J. Gonzalez, Provo, UT (US); Trond Pedersen, Bluffdale, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 315 days.

(21) Appl. No.: 17/992,671

(22) Filed: Nov. 22, 2022

(65) Prior Publication Data

US 2023/0112084 A1    Apr. 13, 2023

Related U.S. Application Data

(63) Continuation of application No. 17/238,472, filed on Apr. 23, 2021, now Pat. No. 11,512,533, which is a (Continued)

(51) Int. Cl.
*C04B 35/52* (2006.01)
*C04B 35/645* (2006.01)
(Continued)

(52) U.S. Cl.
CPC ............ *F16C 33/043* (2013.01); *C04B 35/52* (2013.01); *C04B 35/645* (2013.01); *E21B 4/003* (2013.01);
(Continued)

(58) Field of Classification Search
CPC ...................................................... C04B 35/52
See application file for complete search history.

(56) References Cited

U.S. PATENT DOCUMENTS 3,211,781 A * 10/1965 Hino ..................... C07C 227/22
560/155
3,567,763 A * 3/1971 Emmons et al. ...... C07C 265/04
528/80
(Continued)

FOREIGN PATENT DOCUMENTS

JP         5321032 B2    10/2013
WO     2017034787 A1    3/2017

OTHER PUBLICATIONS

International Search Report and Written Opinion from International Application No. PCT/US2018/03190 dated Jul. 19, 2018.

*Primary Examiner* — Andrew D Graham
(74) *Attorney, Agent, or Firm* — BKRIP LLC

(57) ABSTRACT

Bearing assemblies that include a plurality of polycrystalline diamond ("PCD") bearing elements, bearing apparatuses including such bearing assemblies, and methods of operating and fabricating such bearing assemblies and apparatuses are disclosed. In an embodiment, the plurality of PCD bearing elements of one or more of the bearing assemblies disclosed herein include at least one first PCD bearing element. At least a portion of the first PCD bearing element exhibits a coercivity of about 125 Oersteds or more and a specific magnetic saturation of about 14 Gauss cm$^3$/gram or less. The first PCD bearing element includes a bearing surface with at least one groove formed therein. In an embodiment, the plurality of PCD bearing elements also include at least one second PCD bearing element. The second PCD bearing element exhibits a coercivity that is less than and a specific magnetic saturation that is greater than the first PCD bearing element.

21 Claims, 10 Drawing Sheets

Related U.S. Application Data continuation of application No. 16/614,706, filed as application No. PCT/US2018/033190 on May 17, 2018, now Pat. No. 11,009,071.

(60) Provisional application No. 62/516,226, filed on Jun. 7, 2017.

(51) Int. Cl.
*E21B 4/00* (2006.01)
*E21B 10/22* (2006.01)
*F16C 17/02* (2006.01)
*F16C 17/04* (2006.01)
*F16C 33/04* (2006.01)
*E21B 10/567* (2006.01)

(52) U.S. Cl.
CPC .............. *E21B 10/22* (2013.01); *F16C 17/02* (2013.01); *F16C 17/04* (2013.01); *C04B 2235/427* (2013.01); *E21B 10/567* (2013.01); *F16C 2226/34* (2013.01); *F16C 2240/42* (2013.01); *F16C 2352/00* (2013.01)

(56) References Cited

U.S. PATENT DOCUMENTS

| | | | |
|---|---|---|---|
| D258,828 S | 4/1981 | Zrobek | |
| D436,117 S | 1/2001 | Chuang | |
| D443,627 S | 6/2001 | West | |
| D444,802 S | 7/2001 | Dyson | |
| 6,338,754 B1 | 1/2002 | Cannon | |
| 7,866,418 B2 | 1/2011 | Bertagnolli | |
| 8,074,748 B1* | 12/2011 | Miess | B24D 18/0009 175/434 |
| 8,236,074 B1 | 8/2012 | Bertagnolli | |
| 8,545,104 B2 | 10/2013 | Cooley | |
| D699,272 S | 2/2014 | Mochizuki | |
| 8,668,388 B1 | 3/2014 | Peterson | |
| 8,734,552 B1* | 5/2014 | Vail | F16C 33/043 428/408 |
| 8,746,979 B2 | 6/2014 | Cooley | |
| 8,888,879 B1* | 11/2014 | Mukhopadhyay | G01N 23/005 51/293 |
| 8,995,742 B1 | 3/2015 | Cooley | |
| 9,016,405 B2 | 4/2015 | Cooley | |
| 9,062,710 B2 | 6/2015 | Lee | |
| 9,103,172 B1* | 8/2015 | Bertagnolli | C04B 35/645 |
| 9,403,260 B1* | 8/2016 | Adams | B22F 3/14 |
| D770,547 S | 11/2016 | Yamamoto | |
| D772,964 S | 11/2016 | Ban | |
| D782,180 S | 3/2017 | Eberhard | |
| 9,664,231 B2 | 5/2017 | Omoto | |
| 9,677,617 B2 | 6/2017 | Karlsson | |
| D824,967 S | 8/2018 | Getto | |
| D830,435 S | 10/2018 | Wakisaka | |
| D861,756 S | 10/2019 | Pop | |
| 11,009,071 B2 | 5/2021 | Kolste | |
| 2003/0026718 A1 | 2/2003 | Dziver | |
| 2008/0112658 A1 | 5/2008 | Justin | |
| 2009/0260895 A1 | 10/2009 | Vail | |
| 2010/0166347 A1 | 7/2010 | Wendling | |
| 2012/0057814 A1 | 3/2012 | Dadson | |
| 2012/0241226 A1* | 9/2012 | Bertagnolli | E21B 10/567 175/428 |
| 2013/0000982 A1* | 1/2013 | Olsen | E21B 10/46 175/57 |
| 2013/0092454 A1* | 4/2013 | Scott | C04B 35/5626 175/428 |
| 2013/0180181 A1* | 7/2013 | Nixon | C22C 26/00 51/307 |
| 2014/0366456 A1 | 12/2014 | Chapman | |
| 2014/0367176 A1 | 12/2014 | Gonzalez | |
| 2015/0008047 A1* | 1/2015 | DiGiovanni | C04B 35/52 175/428 |
| 2015/0135603 A1* | 5/2015 | Can | B82Y 30/00 51/309 |
| 2015/0165591 A1* | 6/2015 | Can | C23F 1/02 51/307 |
| 2015/0209745 A1* | 7/2015 | Mukhopadhyay | E21B 10/567 51/297 |
| 2016/0214904 A1* | 7/2016 | Sandstrom | C22C 26/00 |
| 2016/0289078 A1* | 10/2016 | Johnson | B24D 18/0009 |
| 2017/0232521 A1* | 8/2017 | Gledhill | C04B 37/026 175/428 |
| 2019/0247814 A1* | 8/2019 | Stoyanov | C04B 35/575 |
| 2020/0087991 A1* | 3/2020 | Kolste | F16C 17/02 |
| 2021/0114971 A1* | 4/2021 | Venderbosch | C07C 227/22 |

\* cited by examiner

BEARING ASSEMBLIES, BEARING APPARATUSES, AND RELATED METHODS

CROSS-REFERENCE TO RELATED APPLICATIONS

This application is a continuation of U.S. application Ser. No. 17/238,472 filed 23 Apr. 2021, which application is a continuation of U.S. application Ser. No. 16/614,706 filed 18 Nov. 2019, which claims priority to PCT International Application No. PCT/US2018/033190 filed on 17 May 2018, which claims priority to U.S. Provisional Application No. 62/516,226 filed on 7 Jun. 2017, the disclosure of each of which is incorporated herein, in its entirety, by this reference.

BACKGROUND

Wear-resistant, superhard compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs and other superhard compacts have found particular utility as superhard bearing elements in thrust bearings within pumps, turbines, subterranean drilling systems, motors, compressors, generators, gearboxes, and other systems and apparatuses. For example, a PDC bearing element typically includes a superhard diamond layer that is commonly referred to as a diamond table. The diamond table is formed and bonded to a substrate using a high-pressure/high-temperature ("HPHT") process.

A typical bearing apparatus includes a number of superhard bearing elements affixed to a support ring. The superhard bearing elements (e.g., a PDC bearing element) bear against other superhard bearing elements of an adjacent bearing assembly during use. Superhard bearing elements are typically brazed directly into a preformed recess formed in a support ring of a fixed-position thrust-bearing.

Despite the availability of a number of different bearing apparatuses including such PDCs and/or other superhard materials, manufacturers and users of bearing apparatuses continue to seek improved bearing apparatuses.

SUMMARY

Embodiments disclosed herein are directed to bearing assemblies that include a plurality of polycrystalline diamond ("PCD") bearing elements, bearing apparatuses including such bearing assemblies, and methods of operating and fabricating such bearing assemblies and apparatuses. For example, the plurality of PCD bearing elements of one or more of the bearing assemblies disclosed herein include at least one first PCD bearing element. At least a portion (e.g., unleached portion) of the first PCD bearing element exhibits one or more of a coercivity of about 125 Oersteds ("Oe") or more, a specific magnetic saturation of about 14 Gauss·cm$^3$/gram ("G·cm$^3$/g") or less, or an electrical conductivity of less than 1200 siemens per meter ("S/m"). The at least one first PCD bearing element includes a bearing surface having at least one groove formed therein. The at least one groove is configured to improve cooling of the first PCD bearing element during use and/or reduce widespread cracking during brazing of the at least one first PCD bearing element to a support ring. In an embodiment, the plurality of PCD bearing elements also include at least one second PCD bearing element. The at least one second PCD bearing element exhibits a coercivity that is less than and a specific magnetic saturation that is greater than the first PCD bearing element.

In an embodiment, a bearing assembly includes a plurality of PCD bearing elements distributed circumferentially about an axis. The plurality of PCD bearing elements includes at least one first PCD bearing element including a first PCD table. The first PCD table includes a first bearing surface and the first bearing surface has at least one groove formed therein. At least a portion of the first PCD table exhibits at least one of a coercivity of about 125 Oe or more, a specific magnetic saturation of about 14 G·cm$^3$/g or less, or an electrical conductivity of less than 1200 S/m. The plurality of PCD bearing elements also includes at least one second PCD bearing element including a second PCD table. The second PCD table includes a second bearing surface. At least a portion of the second PCD table exhibits at least one of a coercivity that is less than the first PCD table, a specific magnetic saturation that is greater than the first PCD table, or an electrical conductivity that is greater than the first PCD table. The bearing assembly also includes a support ring having the plurality of PCD bearing elements mounted thereto.

In an embodiment, a bearing apparatus includes a first bearing assembly. The first bearing assembly includes a plurality of PCD bearing elements distributed circumferentially about an axis. The plurality of PCD bearing elements includes at least one first PCD bearing element including a first PCD table. The first PCD table includes a first bearing surface and the first bearing surface has at least one groove formed therein. At least a portion of the first PCD table exhibits at least one of a coercivity of about 125 Oe or more, a specific magnetic saturation of about 14 G·cm$^3$/g or less, or an electrical conductivity of less than 1200 S/m. The plurality of PCD bearing elements also includes at least one second PCD bearing element including a second PCD table. The second PCD table includes a second bearing surface. At least a portion of the second PCD table exhibits at least one of a coercivity that is less than the first PCD table, a specific magnetic saturation that is greater than the first PCD table, or an electrical conductivity that is greater than the first PCD table. The first bearing assembly also includes a first support ring having the plurality of PCD bearing elements mounted thereto. The bearing apparatus also includes a second bearing assembly including a second support ring and a plurality of superhard bearing elements mounted to the second support ring. Each of the plurality of superhard bearing elements includes a superhard bearing surface positioned and configured to oppose the first bearing surface of the at least one first PCD bearing element.

In an embodiment, a method of forming a bearing assembly includes providing at least one first PCD bearing element that includes a first PCD table including a first bearing surface. At least a portion of the first PCD table exhibits at least one of a coercivity of 125 Oe or more, a specific magnetic saturation of about 14 G·cm$^3$/g or less, or an electrical conductivity of less than 1200 S/m. The method also includes forming at least one groove in the first bearing surface of the first PCD table. The method further includes mounting a plurality of PCD bearing elements to a support ring. The plurality of PCD bearing elements includes the at least one first PCD bearing element.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Embodiments disclosed herein are directed to bearing assemblies that include a plurality of PCD bearing elements, bearing apparatuses including such bearing assemblies, and methods of operating and fabricating such bearing assemblies and apparatuses. For example, the plurality of PCD bearing elements of one or more of the bearing assemblies disclosed herein include at least one first PCD bearing element. At least a portion (e.g., unleached portion) of the first PCD bearing element may exhibit one or more of: a coercivity of about 125 Oe or more, a specific magnetic saturation of about 14 G·cm$^3$/g or less, or an electrical conductivity of less than 1200 S/m. The at least one first PCD bearing element may include a bearing surface having at least one groove formed therein. The at least one groove may be configured to improve cooling of the first PCD bearing element during use and/or control cracking during brazing of the at least one first PCD bearing element to a support ring. In an embodiment, the plurality of PCD bearing elements also include at least one second PCD bearing element. The at least one second PCD bearing element may exhibit a coercivity that is less than and a specific magnetic saturation that is greater than the first PCD bearing element.

While the description herein provides examples relative to subterranean drilling and motor assemblies, the bearing assembly and apparatus embodiments disclosed herein may be used in any number of applications. For example, the bearing assemblies and apparatuses may be used in a pump or turbine bearing apparatus, motors, compressors, turbo expanders, generators, gearboxes, other systems and apparatuses, or combinations of the foregoing. Furthermore, the bearing assemblies and apparatuses may also be operated hydrodynamically, partially hydrodynamically, or not hydrodynamically, if desired or needed.

Figure 1A:
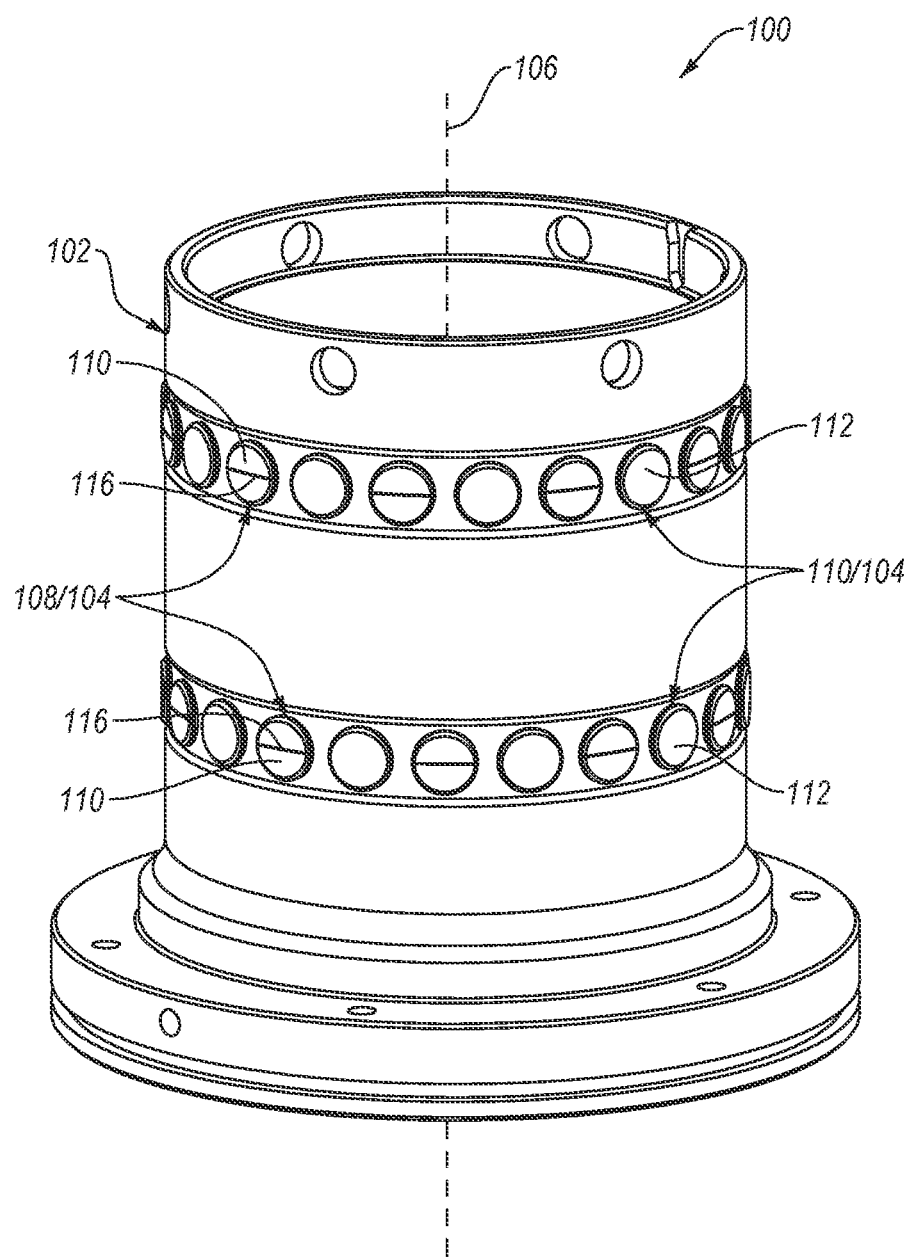
FIG. 1A is an isometric view of a radial bearing assembly, according to an embodiment.
Figure 3:
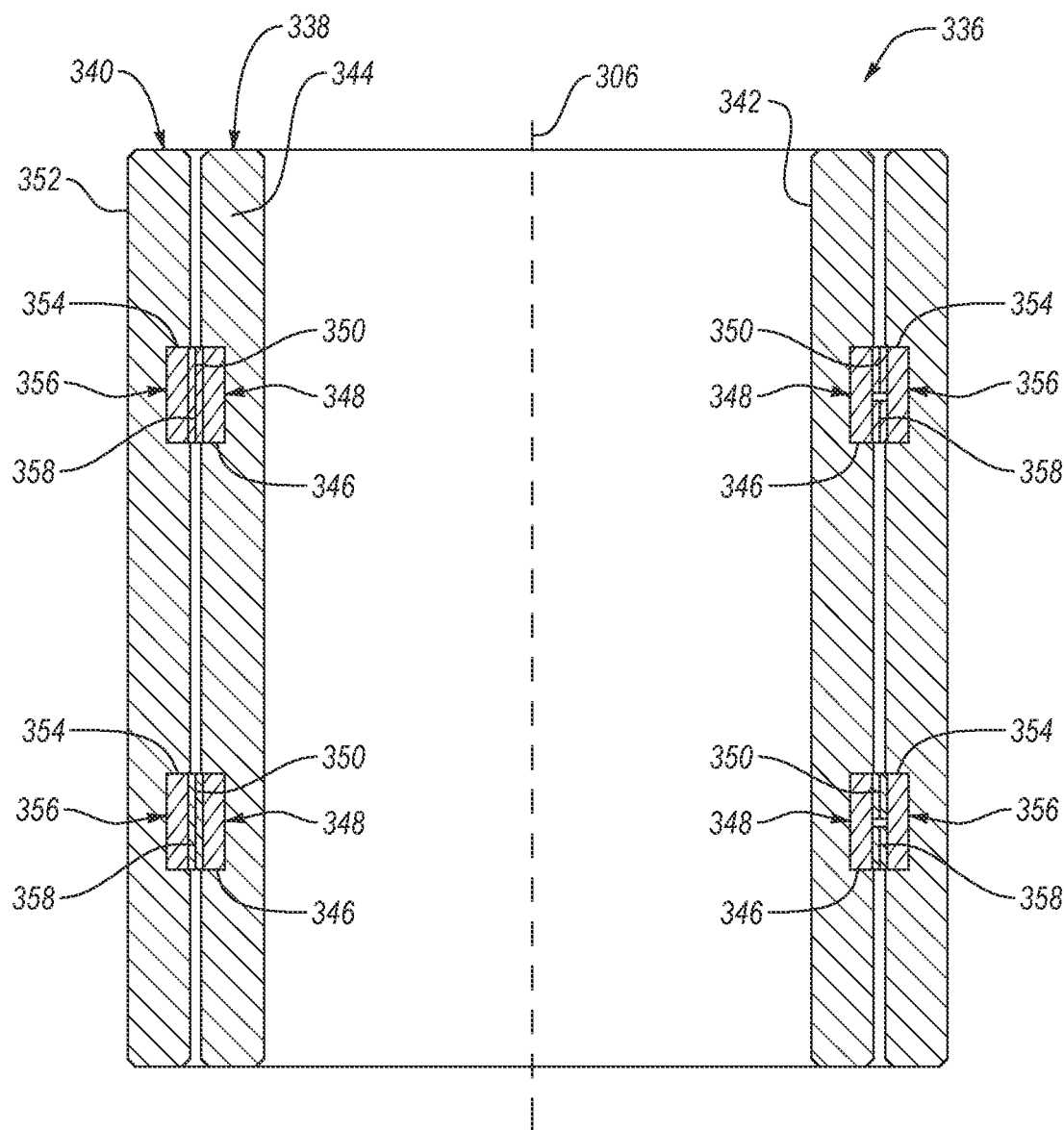
FIG. 3 is a cross-sectional view of a radial bearing apparatus, according to an embodiment.

FIG. 1A is an isometric view of a radial bearing assembly 100, according to an embodiment. The radial bearing assembly 100 may form an inner race of a radial bearing apparatus (FIG. 3). The radial bearing assembly 100 includes a support ring 102 and a plurality of PCD bearing elements 104 mounted to the support ring 102. The support ring 102 extends circumferentially about a rotation axis 106. The PCD bearing elements 104 include at least one first PCD bearing element 108 having a first bearing surface 110 and at least one second PCD bearing element 112 including a second bearing surface 114. In an embodiment, at least a portion of the first PCD bearing element 108 may exhibit a coercivity of about 125 Oe or more and a specific magnetic saturation of about 14 G·cm$^3$/g or less, while the second PCD bearing element 112 exhibits a coercivity that is less than and a specific magnetic saturation that is greater than the first PCD bearing elements 108. As will be discussed in more detail hereafter, forming the PCD bearing elements 104 from the first and second PCD bearing elements 108, 112 may decrease the cost of and/or may improve one or more of the configurability, toughness, or wear resistance of the radial bearing assembly 100 compared to bearing assemblies that only include the first or second PCD bearing element 108, 112. The first PCD bearing elements 108 also include at least one groove 116 formed in the first bearing surface 110. The groove 116 may be configured to act as a crack initiation site that facilitates cracks that may form in the first PCD bearing element 108 to be located at, within, or near the groove 116 during brazing of the first PCD bearing element 108 to the support ring 102. Such a configuration may improve one or more of the toughness, strength, or visual appeal of the first PCD bearing element 108.

The support ring 102 defines a plurality of recesses therein (not shown). Each of the recesses is configured to have at least a portion of a corresponding one of the PCD bearing elements 104 positioned therein. Each of the PCD bearing elements 104 may be mounted (e.g., secured) in the corresponding one of the recesses using any suitable technique. For example, each of the PCD bearing elements 104 may be brazed or press-fitted into a corresponding one of the recesses.

The recesses and, by extension, the PCD bearing elements 104 may be distributed in one or more circumferentially extending rows. For example, as illustrated, the recesses and the PCD bearing elements 104 may be distributed in two circumferentially extending rows that are axially spaced from each other. However, it is understood that the recesses and the PCD bearing elements 104 may be distributed in a single or three or more circumferentially extending rows.

The support ring 102 may be made from a variety of different materials. For example, the support ring 102 may comprise a metal, a metal alloy, alloy steel, carbon steel, stainless steel, tungsten carbide, any other suitable metal, a conductive or non-conductive material, or combinations thereof. The support ring 102 may also include one or more relief features formed between one or more adjacent pairs of the PCD bearing elements 104 as disclosed in U.S. Pat. No. 9,016,405 issued on Apr. 28, 2015, the disclosure of which is incorporated herein, in its entirety, by this reference. Such recesses formed in the support ring 102 may help reduce damage to the PCD bearing elements 104 (e.g., tensile fracture) during brazing of the PCD bearing elements 104 to the support ring 102.

Figure 1B:
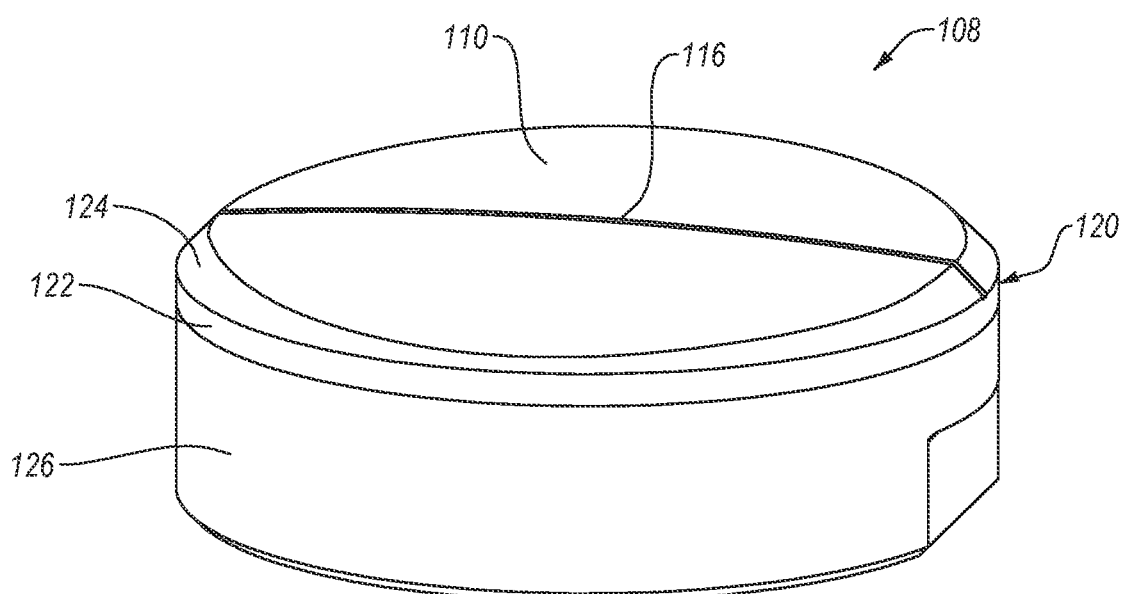
FIG. 1B is an isometric view of one of the first PCD bearing elements illustrated in FIG. 1A, according to an embodiment.

FIG. 1B is an isometric view of one of the first PCD bearing elements 108 illustrated in FIG. 1A, according to an embodiment. The first PCD bearing element 108 includes a first PCD table 120. The first PCD table 120 includes a first bearing surface 110, at least one lateral surface 122, an interfacial surface (not shown, obscured) between the PCD table 120 and the substrate 126 and, optionally, a chamfer 124 extending between the first bearing surface 110 and the lateral surface 122. As shown in FIG. 1A, the radial bearing assembly 100 may be an inner race and the first bearing surfaces 110 may exhibit a convex curvature. Each of the first PCD bearing elements 108 may also include a substrate 126 bonded the first PCD table 120 along an interfacial surface thereof. The substrate 126 may include a cemented carbide substrate, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 126 may comprise cobalt-cemented tungsten carbide.

The first PCD bearing elements 108 may be formed by sintering a plurality of diamond particles in the presence of a metal-solvent catalyst. The diamond particles may exhibit an average particle size of about 50 µm or less, such as about 30 µm or less, about 20 µm or less, about 10 µm to about 20 µm, about 10 µm to about 18 µm, or about 15 µm to about 20 µm. In some embodiments, the average particle size of the diamond particles may be about 10 µm or less, such as about 2 µm to about 5 µm or submicron. In an embodiment, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In one embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. It is noted that the as-sintered diamond grain size may differ from the average particle size of the diamond particles prior to sintering due to a variety of different physical processes, such as grain growth, diamond particles fracturing, carbon provided from another carbon source (e.g., dissolved carbon in the metal-solvent catalyst), or combinations of the foregoing.

In order to efficiently sinter the diamond particles, the diamond particles and the substrate 126 may be enclosed in a pressure transmitting medium, such as a refractory metal can, graphite structure, pyrophyllite, and/or another suitable pressure transmitting structure to form a cell assembly. Examples of suitable gasket materials and cell structures for use in manufacturing the first PCD bearing elements 108 (or any of the PCD bearing elements disclosed herein) are respectively disclosed in U.S. Pat. Nos. 6,338,754 and 8,236,074, each of which is incorporated herein, in its entirety, by this reference. The cell assembly, including the pressure transmitting medium and mass of diamond particles therein, is subjected to an high-pressure/high-temperature ("HPHT") process using an ultra-high pressure press at a temperature of at least about 1000° C. (e.g., about 1100° C. to about 2200° C., or about 1200° C. to about 1450° C.,) and a pressure in the pressure transmitting medium of at least about 7.5 GPa (e.g., about 7.5 GPa to about 15 GPa, at least about 8.0 GPa, at least about 9.0 GPa, at least about 10.0 GPa, at least about 11.0 GPa, at least about 12.0 GPa, or at least about 14 GPa) for a time sufficient to sinter the diamond particles together in the presence of the metal-solvent catalyst and form the first PCD bearing element 108 comprising bonded diamond grains defining interstitial regions occupied by the metal-solvent catalyst. For example, if the substrate 126 includes a metal-solvent catalyst, the metal-solvent catalyst may liquefy and infiltrate the mass of diamond particles to promote growth between adjacent diamond particles of the mass of diamond particles to form the first PCD table 120 comprised of a body of bonded diamond grains having the infiltrated metal-solvent catalyst interstitially disposed between bonded diamond grains.

The pressure values employed in the HPHT processes disclosed herein refer to the pressure in the pressure transmitting medium at room temperature (e.g., about 25° C.) with application of pressure using an ultra-high pressure press and not the pressure applied to exterior of the cell assembly. The actual pressure in the pressure transmitting medium at sintering temperature may be higher.

In an embodiment, the first PCD table 120 may be separately formed using an HPHT sintering process and, subsequently, bonded to the interfacial surface of the substrate 126 by brazing, using a separate HPHT bonding process, or any other suitable joining technique, without limitation. In yet another embodiment, a substrate 126 may be formed by depositing a binderless carbide (e.g., tungsten carbide) via chemical vapor deposition onto the separately formed PCD table.

Many physical characteristics of the first PCD table 120 may be determined by measuring certain magnetic properties of the first PCD table 120 because the metal-solvent catalyst may be ferromagnetic. For example, the amount of the metal-solvent catalyst present in the first PCD table 120 may be correlated with the measured specific magnetic saturation of the first PCD table 120. A relatively larger specific magnetic saturation indicates relatively more metal-solvent catalyst in the first PCD table 120. The amount of the metal-solvent catalyst that is present in the first PCD table 120 may correlate to the thermal stability of the first PCD table 120. In another example, the mean free path between neighboring diamond grains of the first PCD table 120 may be correlated with the measured coercivity of the first PCD table 120. A relatively large coercivity indicates a relatively smaller mean free path. The mean free path is representative of the average distance between neighboring diamond grains of the first PCD table 120, and thus may be indicative of the extent of diamond-to-diamond bonding in the first PCD table 120. A relatively smaller mean free path, in well-sintered PCD, may indicate relatively more diamond-to-diamond bonding. Methods of measuring the specific magnetic saturation and the magnetic properties of the first PCD table 120 are disclosed in U.S. Pat. Nos. 7,866,418 and 9,459,236, the disclosure of each of which is incorporated herein, in its entirety, by this reference.

Generally, as the sintering pressure that is used to form the first PCD table 120 increases, the coercivity may increase and the specific magnetic saturation may decrease. Since the first PCD table 120 may be formed at a pressure of at least about 7.5 GPa, at least a portion of the first PCD table 120 (e.g., an unleached portion of the first PCD table 120) may exhibit a coercivity of 125 Oe or more, a high-degree of diamond-to-diamond bonding, a specific magnetic saturation of about 14 $G \cdot cm^3/g$ or less, and/or a metal-solvent catalyst content of about 7.5 weight % ("wt %") or less. In an embodiment, the first PCD table 120 may exhibit a coercivity of about 125 Oe to about 250 Oe and a specific magnetic saturation of greater than 0 $G \cdot cm^3/g$ to about 14 $G \cdot cm^3/g$. In an embodiment, the first PCD table 120 may exhibit a coercivity of about 130 Oe to about 175 Oe and a specific magnetic saturation of about 5 $G \cdot cm^3/g$ to about 14 $G \cdot cm^3/g$. In an embodiment, the first PCD table 120 may exhibit a coercivity of about 155 Oe to about 175 Oe and a specific magnetic saturation of about 10 $G \cdot cm^3/g$ to about 14 $G \cdot cm^3/g$. In an embodiment, the first PCD table 120 may exhibit a coercivity of about 140 Oe to about 175 Oe and a specific magnetic saturation of about 9 $G \cdot cm^3/g$ to about 12 $G \cdot cm^3/g$. The specific permeability (i.e., the ratio of specific magnetic saturation to coercivity) of the first PCD table 120 may be about 0.10 or less, such as about 0.060 to about 0.10, about 0.060 to about 0.090, or about 0.065 to about 0.075. Despite the average particle size of the bonded diamond grains being less than about 30 μm, the metal-solvent catalyst content in the first PCD table 120 may be less than about 7.5 wt % resulting in a desirable thermal stability and/or abrasion resistance.

Generally, as the sintering pressure that is used to form the PCD increases, the electrical conductivity may decrease. Since the first PCD table 120 was formed at a pressure of at least about 7.5 GPa, at least a portion of the first PCD table 120 (e.g., an unleached portion of the first PCD table 120) may exhibit a coercivity of about 125 Oe or more, a metal-solvent catalyst content of less than about 7.5 wt % as indicated by a specific magnetic saturation of about 14 $G \cdot cm^3/g$ or less, or an electrical conductivity less than about 1200 S/m. For example, the electrical conductivity may be an average electrical conductivity of the first PCD table 120 or another region of the first PCD table 120. In an embodiment, the first PCD table 120 may exhibit a coercivity of about 125 Oe to about 250 Oe, a specific magnetic saturation of greater than 0 $G \cdot cm^3/g$ to about 14 $G \cdot cm^3/g$, and an electrical conductivity of about 25 S/m to about 1000 S/m. In an embodiment, the first PCD table 120 may exhibit a coercivity of about 125 Oe to about 175 Oe, a specific magnetic saturation of about 5 $G \cdot cm^3/g$ to about 14 $G \cdot cm^3/g$, and an electrical conductivity less than about 750 S/m. In an embodiment, the first PCD table 120 may exhibit a coercivity of about 155 Oe to about 175 Oe, a specific magnetic saturation of about 10 $G \cdot cm^3/g$ to about 15 $G \cdot cm^3/g$, and an electrical conductivity less than about 500 S/m. In an embodiment, the first PCD table 120 may exhibit a coercivity of about 155 Oe to about 175 Oe, a specific magnetic saturation of about 10 $G \cdot cm^3/g$ to about 14 $G \cdot cm^3/g$, and an electrical conductivity of about 100 S/m to about 500 S/m. In an embodiment, the first PCD table 120 may exhibit a coercivity of about 130 Oe to about 160 Oe, a specific magnetic saturation of about 5 $G \cdot cm^3/g$ to about 14 $G \cdot cm^3/g$, and an electrical conductivity of about 50 S/m to about 150 S/m. The specific permeability of the PCD may be about 0.10 or less, such as about 0.060 to about 0.090.

As discussed above, the electrical conductivity of at least a portion of the first PCD table 120 may be less than 1200 S/m. In some embodiments, the electrical conductivity may be less than 1000 S/m, such as about 25 S/m to about 1000 S/m. In other embodiments, the electrical conductivity may be less than 750 S/m. In another embodiment, the electrical conductivity may be less than 500 S/m, such as about 100 S/m to about 500 S/m. In a more restrictive embodiment, the electrical conductivity may be about 50 S/m to about 150 S/m.

It is noted that mixing the metal-solvent catalyst with the plurality of diamond particles prior to sintering likely decreases the coercivity and increases the specific magnetic saturation of the as-formed PCD table compared to a PCD table that is formed at substantially similar HPHT conditionals and from substantially similar diamond particles that are not mixed with the metal-solvent catalyst. For example, sintering a mixture of diamond particles and the metal-solvent catalyst (e.g., a metal-solvent catalyst content of less than 7.5 weight %) at a pressure of about 7.7 GPa and a temperature of about 1400° C. may form a PCD table exhibiting a coercivity that is less than 125 Oe and a specific magnetic saturation that is greater than 14 $G \cdot cm^3/g$. However, sintering a mixture of diamond particles with a metal-solvent catalyst at a pressure that is significantly greater than 7.7 GPa (e.g., at least 8.5 GPa, at least 9 GPa, at least 10 GPa, at least 11 GPa, or at least 12 GPa) may be sufficient to form a PCD table exhibiting a coercivity that is greater than 125 Oe and a specific magnetic saturation that is less than 14 $G \cdot cm^3/g$.

The first PCD table 120 may exhibit enhanced wear resistance and thermal stability compared to a PCD table that is formed at a lower pressure. However, the first PCD table 120 may also be more brittle and/or may exhibit compressive stresses therein. The brittleness and/or the compressive stresses of the first PCD table 120 may cause cracking in the first PCD table 120, such as visible cracking or patterned crack formation (e.g., radially or circumferentially extending cracks). For example, referring to FIG. 1A, the first PCD bearing element 108 may be brazed to the recesses of the support ring 102. Brazing the first PCD bearing element 108 may result in cracks being formed in the first PCD table 120. The cracks may decrease one or more of the toughness, wear-resistance, or strength of the first PCD bearing element 108. The cracks may also reduce the visual appearance of the radial bearing assembly 100 which may result in consumer dissatisfaction.

To at least partially remedy this problem, the first PCD bearing element 108 may include at least one groove 116 formed in the first bearing surface 110. In an embodiment, the groove 116 may reduce compressive stresses in the first PCD table 120. As such, the groove 116 reduces the number of crack that are formed in the first PCD table 120 compared to a substantially similar PCD table that does not include the groove 116 when the first PCD bearing element 108 is brazed to the support ring 102. In another embodiment, the groove 116 may act as a crack initiation site. As such, the groove 116 may affect where most of the cracks form. In particular, the groove 116 may concentrate crack formation at, within, or near the groove 116. Such a configuration may enable portions of the first PCD table 120 that are spaced from the groove 116 to exhibit substantially less cracking than if the groove 116 was omitted. Additionally, facilitating crack formation at, within, or near the groove 116 may make the cracks harder to detect visually, thereby improving the visual appearance of the first PCD bearing element 108. In an embodiment, the groove 116 may also act as a cooling mechanism during use. In particular, the groove 116 may increase the surface area of the first PCD bearing element 108 that is exposed to a cooling fluid thereby increasing the amount of thermal energy that is transferred from the first PCD bearing element 108 to the cooling fluid during use.

In an embodiment, as illustrated, the groove 116 may be configured to extend generally circumferentially about the rotation axis 106 (e.g., the groove is centered about the axis of rotation) when the first PCD bearing element 108 is mounted to the support ring 102. In such an embodiment, the groove 116 may be configured to extend in a generally arcuate path (e.g., follows a path of a circle centered about the rotation axis 106) or in a generally straight path that extends substantially tangentially to a circle that is centered about the rotation axis 106. Forming the groove 116 to extend generally circumferentially about the rotation axis 106 may inhibit the groove 116 from causing the first PCD table 120 to chip during operation. In an embodiment, the groove 116 may be configured to extend along a generally straight path. In an embodiment, the first PCD bearing element 108 may exhibit a generally cylindrical shape and the groove 116 may extend through or from a center of the generally circular first bearing surface 110. However, it is understood that the groove 116 may extend in any direction. For example, the groove 116 may extend parallel to or at an oblique angle relative to the rotation axis 106, such as any groove 116 extending along a major axis of the first bearing surface 110. Examples of grooves that may be formed in the first bearing surface 110 (e.g., methods, groove dimensions, etc.) are disclosed in U.S. Pat. No. 8,668,388, the disclosure of which is incorporated herein, in its entirety, by this reference.

In an embodiment, as illustrated in FIG. 1A, each of the grooves 116 extends across an entirety of the first bearing surface 110. The groove 116 may also extend into the chamfer 124. In such an embodiment, the groove 116 may improve thermal dissipation from the first PCD table 120. In an embodiment, the groove 116 only extends through a portion of the first bearing surface 110 such that the groove 116 terminates at a selected location in the first bearing surface 110 that is spaced from the chamfer 124 or the lateral surface 122. Terminating the groove 116 at some location in the first bearing surface 110 may cause crack formation to occur within a relatively small percentage of the first bearing surface 110, as opposed to if the groove 116 extended completely through the first bearing surface 110.

The grooves 116 may be partially defined by a depth measured from the first bearing surface 110 to a bottommost surface/portion (not shown) of such respective groove 116. The bottommost surface/portion of each groove 116 may be the surface/portion of such groove 116 that is most proximate to the interfacial surface of the first PCD table 120. In an embodiment, the depth of a groove 116 is substantially constant along a significant portion of such groove 116. For example, the first bearing surface 110 may exhibit a convex curvature and a portion of the bottommost surface/portion of the groove 116 that corresponds to the first bearing surface 110 may also exhibit a convex curvature. In an embodiment, the depth of the groove 116 varies along a length thereof. For example, the bottommost surface/portion of the groove 116 may be substantially planar. In such an example, the groove 116 may be formed before the first bearing surface 110 is formed.

In an embodiment, a first PCD bearing element 108 may be initially formed with the intention of using the PCD as a PCD cutting element. However, PCD cutting elements may require specific dimensions, characteristics, and tolerances. PCD cutting elements that do not meet these specific dimensions, characteristics, and tolerances may be used as a first PCD bearing element 108. For example, a first PCD bearing element 108 is formed using any of the processes disclosed above. However, a first PCD bearing element 108 may exhibit one or more dimensions, characteristics, tolerances, or defects that preclude a first PCD bearing element 108 from being used as a PCD cutting element.

For example, PCD cutting elements may require a PCD table exhibiting an average thickness of about 0.75 mm to about 4 mm (e.g., about 0.9 mm to about 3 mm, about 0.75 mm to about 1.5 mm, about 1 mm to about 2 mm, about 1.5 mm to about 2.5 mm, about 2 mm to about 3 mm, about 2.5 mm to about 3.5 mm, or about 3 mm to about 4 mm) measured from an upper surface to an interfacial surface thereof. The first PCD table 120 may exhibit a thickness that is greater than or less than any or all of the average thickness provided above. In another example, the PCD cutting elements include a PCD table exhibiting an average diameter of about 12 mm to about 20 mm, such as about 13 mm to about 19 mm, about 12 mm to about 14 mm, about 13 mm to about 15 mm, about 14 mm to about 16 mm, about 15 mm to about 17 mm, about 16 mm to about 18 mm, about 17 mm to about 19 mm, or about 18 mm to about 20 mm. The first PCD table 120 may exhibit a diameter that is greater than or less than any or all of the average diameter ranges provided above. In another example, the PCD cutting elements may exhibit a thickness or diameter that varies by at most 50 µm to about 1000 µm, such as about 100 µm to about 500 µm, about 100 µm to about 300 µm, or about 250 µm to about 750 µm. The first PCD table 120 may exhibit a thickness or diameter that varies more than any or all of the acceptable variations provided above. In another example, the PCD cutting elements exhibit an average height of about 4 mm to about 15 mm, such as about 5 mm to about 13 mm, about 4 mm to about 6 mm, about 5 mm to about 7 mm, about 6 mm to about 8 mm, about 7 mm to about 9 mm, about 8 mm to about 10 mm, about 9 mm to about 12 mm, about 11 mm to about 13 mm, or about 12 mm to about 15 mm. The first PCD bearing element 108 may exhibit a height that is less than any or all of the heights provided above.

In an embodiment, the PCD cutting elements that do not meet one or more of above requirements may be segregated and/or placed in a container. The first PCD bearing element 108 that is mounted to the support ring 102 may be selected from such segregated PCDs. In an embodiment, the rejected PCD cutting elements that may be formed using different components or processes. As such, when a plurality of first PCD bearing element 108 are mounted to the support ring 102, at least two of the first PCD bearing elements 108 may exhibit different properties. For example, at least one of the first PCD bearing elements 108 may exhibit a planar interfacial surface and at least one other first PCD bearing element 108 may exhibit a nonplanar interfacial surface. In another example, at least one of the first PCD bearing elements 108 exhibits a first average grain size and at least one other first PCD bearing element 108 exhibits a second average grain size that is different than the first average grain size. In another example, at least one of the first PCD bearing elements 108 exhibits a first grain size distribution (e.g., single mode grain size distribution, bimodal grain size distribution, a mixture of two or more different grain sizes) and at least one other first PCD bearing element 108 exhibits a second grain size distribution that is different than the first particle size distribution. In another example, at least one of the first PCD bearing elements 108 is formed in an HPHT process exhibiting a first pressure and a first temperature and at least one other first PCD bearing element 108 is formed in an HPHT process exhibiting a second pressure that is different than the first pressure and/or a second temperature that is different than the first temperature. In any of the examples provided above, the first PCD bearing elements 108 that are mounted to the support ring 102 may exhibit different properties, such as different wear resistances, different hardnesses, different toughnesses, different strengths, different magnetic properties (coercivity, specific magnetic saturation, or magnetic permeability), etc.

The different properties of the first PCD bearing elements 108 enable the radial bearing assembly 100 to be configured for different applications. For example, the radial bearing assembly 100 may include at least one wear-resistant first PCD bearing element and at least one tough first PCD bearing element. The wear-resistant first PCD bearing element may exhibit a higher G-ratio than the tough first PCD bearing element. Similarly, the tough first PCD bearing element may exhibit better toughness than the wear-resistant first PCD bearing element. The properties of the first bearing elements may be tested and/or selected using evaluation techniques, such as the magnetic testing or G-ratio testing techniques disclosed in U.S. Pat. Nos. 7,866,418 and 9,459,236 (the disclosure of each of which was previously incorporated herein), the electrical impedance testing techniques disclosed in U.S. Pat. No. 9,315,881, the disclosure of which is incorporated herein, in its entirety, by this reference, an energy-dispersive x-ray spectroscopy method, a microscopy imaging method (e.g., using scanning electron microscopes), computed tomography scanning methods (see U.S. Pat. No. 8,995,742, the disclosure of which is incorporated herein, in its entirety, by this reference), or another suitable method.

Figure 1C:
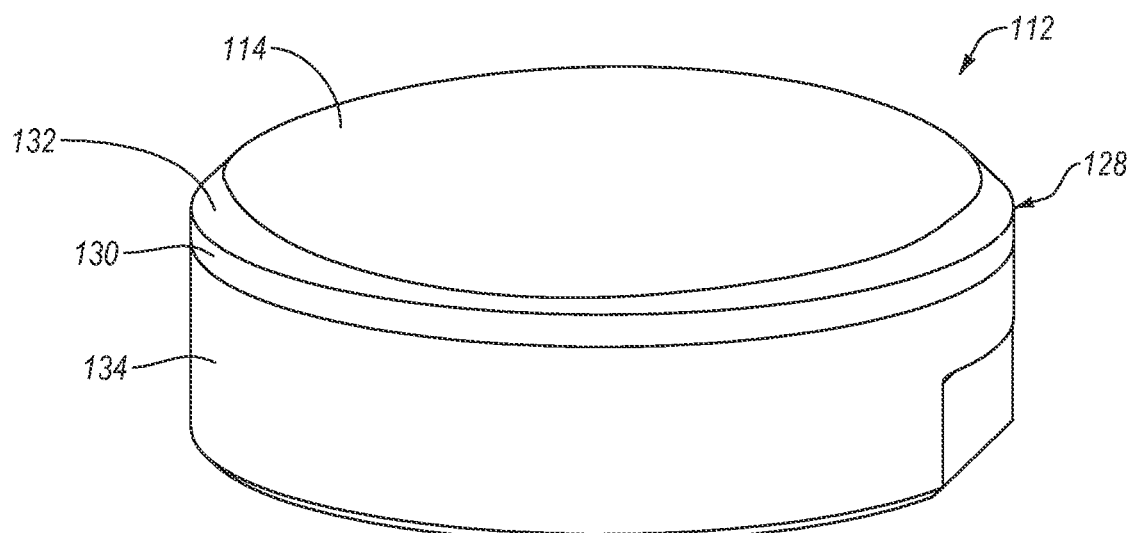
FIG. 1C is an isometric view of one of the second PCD bearing elements illustrated in FIG. 1A, according to an embodiment.

FIG. 1C is an isometric view of one of the second PCD bearing elements 112 illustrated in FIG. 1A, according to an embodiment. The second PCD bearing element 112 includes a second PCD table 128. The second PCD table 128 includes a second bearing surface 114, at least one lateral surface 130, an interfacial surface (not shown) that opposed the second bearing surface 114, and, optionally, a chamfer 132 extending between the second bearing surface 114 and the lateral surface 130. As shown in FIG. 1A, the radial bearing assembly 100 is an inner race and the second bearing surface 114 exhibits a convex curvature. The second PCD bearing element 112 may also include a substrate 134 bonded to the interfacial surface of the second PCD table 128. The substrate 134 may include any of the substrates disclosed above, including a substrate that is the same as or different the substrate 126 of the first PCD bearing element 108.

The second PCD bearing element 112 may be formed by sintering a plurality of diamond particles in the presence of a metal-solvent catalyst. The diamond particles that form the second PCD bearing element 112 may exhibit any of the particle sizes or particle size distributions disclosed herein.

In order to sinter the mass of diamond particles into the second PCD bearing element 112, the diamond particles and the substrate 134 may be enclosed in any of the pressure transmitting mediums disclosed herein to form a cell assembly. The metal-solvent catalyst that is used to sinter the diamond particles into the second PCD bearing element 112 is also disposed in the pressure transmitting medium. For example, the metal-solvent catalyst may be present in the substrate 134 or mixed with the plurality of diamond particles. The cell assembly, including the pressure transmitting medium and the diamond particles therein, may be subjected to an HPHT process using an ultra-high pressure press at a temperature of at least about 1000° C. (e.g., about 1100° C. to about 2200° C., or about 1200° C. to about 1450° C.) and a pressure in the pressure transmitting medium of 7.5 GPa or less (e.g., less than 7 GPa, less than 6.5 GPa, less than 6 GPa, less than 5.5 GPa, less than 5 GPa, about 5 GPa to 7.5 GPa, or about 5 GPa to about 6.5 GPa) for a time sufficient to sinter the diamond particles together in the presence of the metal-solvent catalyst and form the second PCD table 128 comprising bonded diamond grains defining interstitial regions occupied by the metal-solvent catalyst. It is noted that, in some embodiments, the cell assembly may be subjected to a pressure that is greater than about 7.5 GPa, such as when the diamond particles includes metal-solvent catalyst pre-mixed therewith.

In an embodiments, the second PCD table 128 may be separately formed using an HPHT sintering process and, subsequently, bonded to the interfacial surface of the substrate 134 by brazing, using a separate HPHT bonding process, or any other suitable joining technique, without limitation. In yet another embodiment, a substrate 134 may be formed by depositing a binderless carbide (e.g., tungsten carbide) via chemical vapor deposition onto the separately formed PCD table.

Similar to the first PCD table 120, many physical characteristics of the second PCD table 128 may be determined by measuring certain magnetic properties of the second PCD table 128. The second PCD table 128 exhibits a coercivity that is less than and/or a specific magnetic saturation that is greater than the first PCD table 120 because the second PCD table 128 may exhibit more metal-solvent catalyst or a greater mean free path than the first PCD table 120. The second PCD table 128 exhibits more metal-solvent catalyst and a greater mean free path than the first PCD table 120 because the second PCD table 128 is formed in an HPHT process that exhibits a pressure that is less than about 7.5 GPa and/or is formed from a mixture of diamond grains and metal-solvent catalyst particles. Additionally, the second PCD table 128 may exhibit a specific permeability that is greater than the first PCD table 120.

In an embodiment, at least a portion (e.g., an unleached portion) of the second PCD table 128 exhibits a coercivity that is less than 155 Oe and a specific magnetic saturation of about 15 G·cm$^3$/g or more. In such an embodiment, the portion of the second PCD table 128 that exhibits the above magnetic properties may also exhibit a specific permeability that is greater than about 0.1 G·cm$^3$/g Oe. In an embodiment, at least a portion of the second PCD table 128 exhibits a coercivity that is about 140 Oe to about 155 Oe and a specific magnetic saturation of about 140 G·cm$^3$/g to about 155 G·cm$^3$/g. In such an embodiment, the portion of the second PCD table 128 that exhibits the above magnetic properties also exhibits specific permeability that may be about 0.1 G·cm$^3$/g Oe to about 0.13 G·cm$^3$/g Oe. In an embodiment, at least a portion of the second PCD table 128 exhibits a coercivity that is about 115 Oe or less and a specific magnetic saturation of about 15 G·cm$^3$/g or more. In such an embodiment, the portion of second PCD table 128 that exhibits the above magnetic properties may also exhibit a specific permeability that is greater than about 0.13 G·cm$^3$/g Oe. In an embodiment, at least a portion of the second PCD table 128 exhibits a coercivity that is about 90

Oe to about 110 Oe and a specific magnetic saturation of about 16 G·cm³/g to about 20 G·cm³/g. In such an embodiment, the portion of the second PCD table 128 that exhibits the above magnetic properties may also exhibit a specific permeability of about 0.14 G·cm³/g Oe to about 0.22 G·cm³/g Oe. In any of the embodiments disclosed above, the portion of the second PCD table 128 that exhibits the above magnetic properties may exhibit a metal-solvent catalyst that is greater than about 7.5 weight %, such as greater than about 8 weight %, greater than about 8.5 weight %, or greater than 9 weight %. In any of the embodiments disclosed above, the portion of the second PCD table 128 that exhibits the above magnetic properties may exhibit an electrical conductivity that is greater than the electrical conductivity of the first PCD table 120 (FIG. 1B), such as greater than about 1250 S/m, greater than about 1300 S/m, greater than about 1400 S/m, greater than about 1500 S/m, or about 1250 S/m to about 1500 S/m.

Generally, in an embodiment, the second PCD table 128 may exhibit a wear-resistance and thermal stability that is less than the first PCD table 120. However, referring to FIG. 1A, the decreased wear-resistance of the second PCD table 128 may result in the second PCD table 128 forming a wear surface of the radial bearing assembly 100. As such, the radial bearing assembly 100 may wear-in faster than if the radial bearing assembly 100 was formed only from the first PCD bearing elements 108. Wearing-in the radial bearing assembly 100 may enable the radial bearing assembly 100 to exhibit a collective bearing surface (e.g., the first and second bearing surfaces 110, 114) that is more polished, generates less heat during operation, and/or requires less force to rotate. Additionally, the second PCD table 128 may exhibit better toughness (e.g., increased shock and chipping resistance) due, at least in part, to the relatively increased metal-solvent catalyst content. As such, the second PCD table 128 may result in the radial bearing assembly 100 exhibiting better toughness than if the radial bearing assembly 100 is formed only from the first PCD bearing elements 108.

In an embodiment, the second PCD table 128 is less brittle than and exhibits less residual compressive stresses than the first PCD table 120. As such, the second PCD table 128 is less likely to form cracks therein than the first PCD table 120 during brazing to the support ring 102. Therefore, in an embodiment, the second bearing surface 114 of the second PCD table 128 does not include at least one groove formed therein. Not forming a groove in the second bearing surface 114 of the second PCD table 128 reduce costs of manufacturing the radial bearing assembly 100. However, in an embodiment, the second bearing surface 114 of the second PCD bearing element 112 may include at least one groove (not shown) formed therein. Such a groove formed in the second bearing surface 114 may be similar or identical to any of the grooves disclosed herein.

As previously discussed, the second PCD bearing element 112 may exhibit one or more properties that are different than the first PCD bearing element 108. The different properties of the first and second PCD bearing elements 108, 112 may enable the radial bearing assembly 100 to be more configurable or cheaper than if one of the first or second PCD bearing element 108, 112 is omitted from the radial bearing assembly 100. For example, forming the radial bearing assembly 100 from the first PCD bearing elements 108 may increase the overall wear resistance, hardness, cost, and/or strength of the radial bearing assembly 100 and forming the radial bearing assembly 100 from the second PCD bearing elements 112 may increase the overall toughness, decrease the cost, and/or facilitate wearing-in of the radial bearing assembly 100 than if one of the first or second PCD bearing elements 108, 112 are omitted from the radial bearing assembly 100.

In an embodiment, as illustrated, the first and second PCD bearing elements 108, 112 are dispersed throughout each row of PCD bearing elements 104, such as uniformly dispersed through each row. In an embodiment, the first and second PCD bearing elements 108, 112 are not dispersed throughout each row of PCD bearing elements 104. For example, a portion of the radial bearing assembly 100 may be expected to have larger forces applied thereto compared to another portion of the radial bearing assembly 100. As such, the portion of the radial bearing assembly 100 that is expected to having larger forces applied thereto may substantially only include the first PCD bearing elements 108 and/or the portion of the radial bearing assembly 100 that is expected to have smaller forced applied thereto may substantially only include the second PCD bearing elements 112.

As previously discussed, each of the one or more rows of PCD bearing elements 104 may include at least one first PCD bearing element 108 and at least one second PCD bearing element 112. For example, each of the one or more rows of PCD bearing elements 104 includes at least one, at least about two, at least three, at least four, at least five, at least seven, at least ten, at least fifteen, or at least twenty first PCD bearing elements 108. For example, each of the one or more rows of PCD bearing elements 104 include 1 to 3 first PCD bearing elements 108, 2 to 5 first PCD bearing elements 108, 4 to 7 first PCD bearing elements 108, 5 to 10 first PCD bearing elements 108, 7 to 15 first PCD bearing elements 108, or 10 to 20 first PCD bearing elements 108. In another example, each of the one or more rows of PCD bearing elements 104 includes at least one, at least two, at least three, at least four, at least five, at least seven, at least ten, at least fifteen, or at least twenty second PCD bearing elements 112. For example, each of the one or more rows of PCD bearing elements 104 includes 1 to 3 second PCD bearing elements 112, 2 to 5 second PCD bearing elements 112, 4 to 7 second PCD bearing elements 112, 5 to 10 second PCD bearing elements 112, 7 to 15 second PCD bearing elements 112, or 10 to 20 second PCD bearing elements 112. In another example, the first PCD bearing elements 108 forms at least 5% of the PCD bearing elements 104, such as at least about 10%, at least about 20%, at least about 25%, at least about 33%, at least about 50%, at least about 67%, at least about 75%, at least about 80%, at least about 90%, about 5% to about 25%, about 10% to about 33%, about 25% to about 50%, about 33% to about 67%, about 50% to about 75%, about 67% to about 80%, or about 75% to about 90% of the PCD bearing elements 104. In such an example, the remainder of the bearing elements 104 may include one or more second PCD bearing elements 112 or may be solely second PCD bearing elements 112.

In an embodiment, the first and/or second PCD tables 120, 128 are at least partially leached to deplete a metal-solvent catalyst or a metallic infiltrant therefrom in order to enhance the thermal stability of the first and/or second PCD tables 120, 128. For example, the first and/or second PCD tables 120, 128 may be leached to remove at least a portion of the metal-solvent catalyst from a working region thereof to a selected depth to form a leached region. The leached thermally-stable region may extend inwardly from the first and/or second bearing surface 110, 114 to a selected depth. In an embodiment, the depth of the leached region may be about 10 μm to about 1500 μm. More specifically, in some embodiments, the selected depth is about 50 μm to about 100 μm, about 100 μm to about 350 μm, about 200 μm to about 600 μm, about 400 μm to about 750 μm, or about 750 μm to about 1200 μm. The leaching may be performed in a suitable acid, such as aqua regia, nitric acid, hydrofluoric acid, or mixtures of the foregoing. It is noted that the magnetic properties disclosed herein refer to magnetic properties of the unleached portions of the first and/or second PCD tables 120, 128.

It is noted that the radial bearing assembly 100 may include one or more additional bearing elements that are distinct from the first or second PCD bearing element 108, 112. For example, the one or more additional bearing elements may include non-diamond superhard bearing elements. Superhard bearing elements include a superhard material exhibiting a hardness that is at least equal to tungsten carbide, such as polycrystalline cubic boron nitride, polycrystalline diamond (e.g., formed by chemical vapor deposition or by HPHT sintering), diamond crystals, silicon carbide, silicon nitride, tantalum carbide, tungsten carbide (e.g., binderless tungsten carbide, cobalt-cemented tungsten carbide), boron carbide, reaction-bonded silicon carbide or reaction-bonded silicon nitride, other metal carbides, other superhard ceramic carbides, or combinations thereof. In another example, the one or more additional bearing elements may include a PCD bearing element that is substantially similar to the first PCD bearing element that does not include at least one groove formed therein.

Figure 2A:
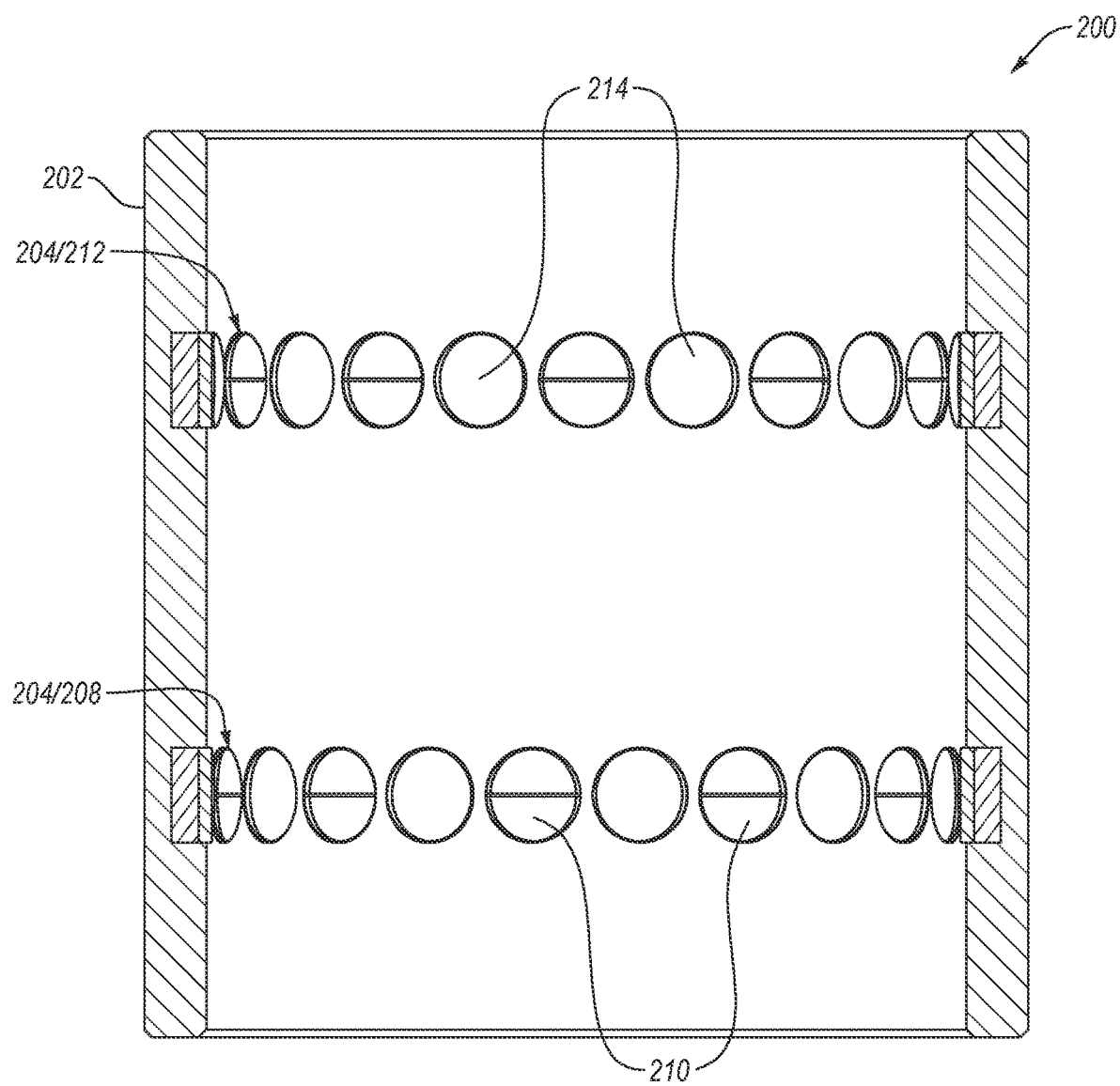
FIG. 2A is a cross-sectional view of a radial bearing assembly, according to an embodiment.

FIG. 2A is a cross-sectional view of a radial bearing assembly 200, according to an embodiment. The radial bearing assembly 200 may form an outer race of a radial bearing apparatus (e.g., radial bearing apparatus 336 of FIG. 3). The radial bearing assembly 200 includes a support ring 202 that may be formed from any of the support ring materials disclosed above. The support ring 202 includes a plurality of recesses (not shown), each extending from a concave surface thereof, the recesses arranged in one or more circumferentially extending rows. The radial bearing assembly 200 also includes a plurality of PCD bearing elements 204 mounted (e.g., brazed or press-fitted) to the support ring 202, with each bearing element 204 and at least partially positioned in a corresponding one of the plurality of recesses. The PCD bearing elements 204 include at least one first PCD bearing element 208 having a concave first bearing surface 210 and at least one second PCD bearing element 212 having a concave second bearing surface 214.

Figure 2B:
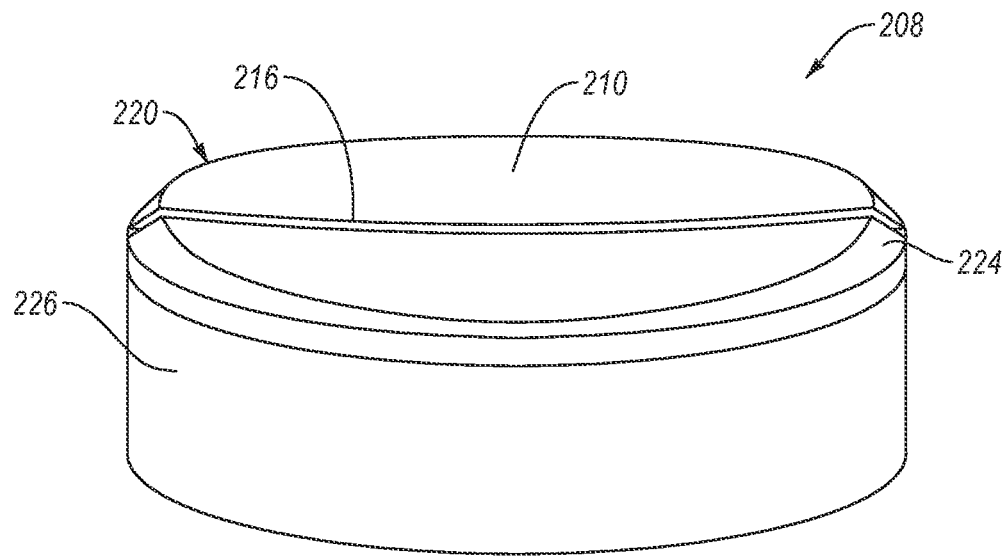
FIG. 2B is an isometric view of the first PCD bearing element shown in FIG. 2A, according to an embodiment.

FIG. 2B is an isometric view of the first PCD bearing element 208 shown in FIG. 2A, according to an embodiment. The first PCD bearing element 208 includes a first PCD table 220 bonded to a substrate 226. As shown, the first PCD table 220 defines a first bearing surface 210 that exhibits a concave curvature and, optionally, a chamfer 224. The first PCD bearing element 208 may be formed using the same or similar HPHT process as described herein with respect to the first PCD bearing element 108 of FIG. 1B. As such, the first PCD bearing element 208 may exhibit one or more of the magnetic properties, electrical properties, wear-resistances, or thermal stability characteristics as the first PCD bearing element 108 of FIG. 1B. For example, the first PCD table 220 may exhibit one or more of a coercivity of about 125 Oe or more, a specific magnetic saturation of about 14 G·cm$^3$/g or less, or an electrical conductivity of less than 1200 S/m. In another example, the first bearing surface 210 of the first PCD table 220 includes at least one groove 216 formed therein. In an embodiment, the first PCD table 220 may be brittle and may exhibit a high compressive stress.

Figure 2C:
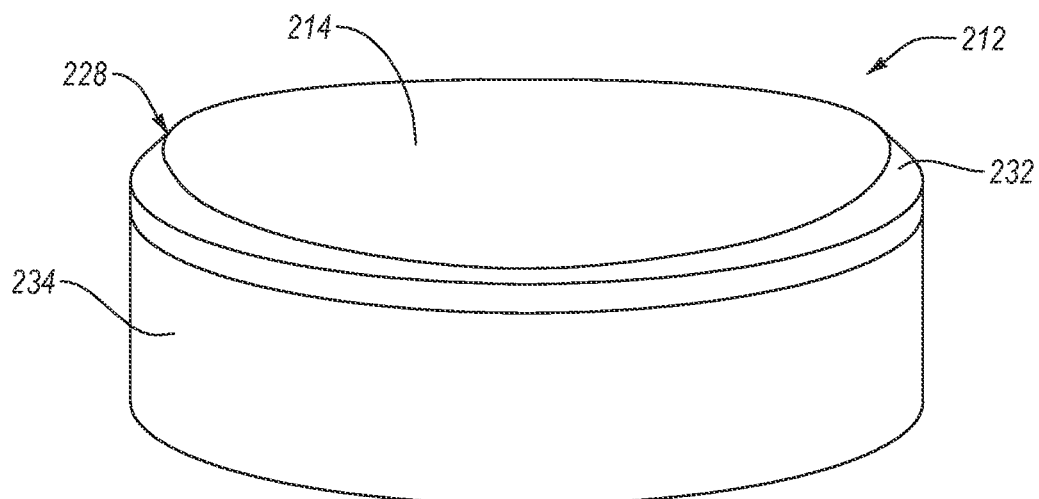
FIG. 2C is an isometric view of the second PCD bearing element shown in FIG. 2A, according to an embodiment.

FIG. 2C is an isometric view of the second PCD bearing element 212 shown in FIG. 2A, according to an embodiment. The second PCD bearing element 212 includes a second PCD table 228 bonded to a substrate 234. As shown, the second PCD table 228 defines a second bearing surface 214 that exhibits a concave curvature and, optionally, a chamfer 232. The second PCD bearing element 212 may be formed using the same or similar HPHT process described herein with respect to as the second PCD bearing element 212 of FIG. 1C. As such, the second PCD bearing element 212 may exhibit one or more of the magnetic properties, electrical properties, wear-resistances, or thermal stability characteristics as the second PCD bearing element 112 of FIG. 1C. For example, the second PCD table 228 may exhibit a coercivity that is less than and a specific magnetic saturation that is greater than the first PCD table 220. In another example, the second bearing surface 214 of the second PCD table 228 may or may not include at least one groove formed therein (e.g., the groove 216 as shown in FIG. 2B).

FIG. 3 is a cross-sectional view of a radial bearing apparatus 336, according to an embodiment. The radial bearing apparatus 336 includes a first bearing assembly 338 that forms an inner race of the radial bearing apparatus 336 and a second bearing assembly 340 that forms an outer race of the radial bearing apparatus 336. The first bearing assembly 338 (e.g., rotor that rotates about a rotation axis 306) of the radial bearing apparatus 336 is received concentrically by the second bearing assembly 340 (e.g., stator) of the radial bearing apparatus 336. The terms "rotor" and "stator" refer to the rotating and stationary components of the radial bearing system, respectively. Thus, if the first bearing assembly 338 is configured to remain stationary, the first bearing assembly 338 may be referred to as the stator and the second bearing assembly 340 may be referred to as the rotor.

Generally, each support ring 344, 352 may have a plurality of bearing elements attached thereto, respectively, with or without recesses. The first bearing assembly 338 (e.g., a rotor) may have an interior surface 342 defining a hole for receiving a shaft or other component. In an embodiment, the first bearing assembly 338 may include a first support ring 344 including a plurality of first recesses 346 that receive a plurality of convex superhard bearing elements 348 that include a convex superhard bearing surface 350. The first support ring 344 includes one or more rows of the first recesses 346. The convex superhard bearing elements 348 may be secured to the first support ring 344 by brazing, press-fitting, mechanically attached (e.g., via threaded fasteners), or another suitable technique. The second bearing assembly 340 includes a second support ring 352 including a plurality of second recesses 354 that receive a plurality of concave superhard bearing elements 356 that include a concave superhard bearing surface 358. The concave superhard bearing surfaces 358 and the concave superhard bearing elements 356 are configured to contact and slide or move relative to each other. In an embodiment, the second support ring 352 may include one or more rows of the second recesses 354. The concave superhard bearing elements 356 may be secured to the second support ring 352 by brazing, press-fitting, or another suitable technique.

In an embodiment, the first bearing assembly 338 is the same as or substantially similar to the radial bearing assembly 100 of FIG. 1A and the second bearing assembly 340 is the same as or substantially similar to the radial bearing assembly 200 of FIG. 2A. For example, the convex superhard bearing elements 348 may include the first and second PCD bearing elements 108, 112 of FIGS. 1A-1C and the concave superhard bearing elements 356 may include the first and second PCD bearing elements 208, 212 of FIGS. 2A-2C.

In an embodiment, one of the first or second bearing assembly 338, 340 is the same as or substantially similar to the radial bearing assembly 100 of FIG. 1A or the radial bearing assembly 200 of FIG. 2A. In such an embodiment, the bearing elements of the other of the first or second bearing assembly 338, 340 include a superhard table, such as a superhard table bonded to a substrate. The superhard table includes a superhard bearing surface (e.g., the convex or concave superhard bearing surface 350, 358) that is formed from a superhard material. As previously discussed, a superhard material includes any material exhibiting a hardness at least equal to tungsten carbide.

In operation, rotation of a shaft or other structure (not shown) secured to the first bearing assembly 338 may rotate the first bearing assembly 338 relative to the second bearing assembly 340. Drilling fluid, lubrication, or other fluid may be pumped between or in contact with the convex superhard bearing surfaces 350 and the concave superhard bearing surfaces 358. In an embodiment, at relatively high rotational speeds, a fluid film or partial fluid film may at least partially develop between the convex superhard bearing surfaces 350 and the concave superhard bearing surfaces 358 and may develop sufficient pressure to maintain the convex superhard bearing surfaces 350 and the concave superhard bearing surface 358 apart from each other. At other operational conditions, the convex superhard bearing surfaces 350 and the concave superhard bearing surface 358 may contact each other.

Figure 4:
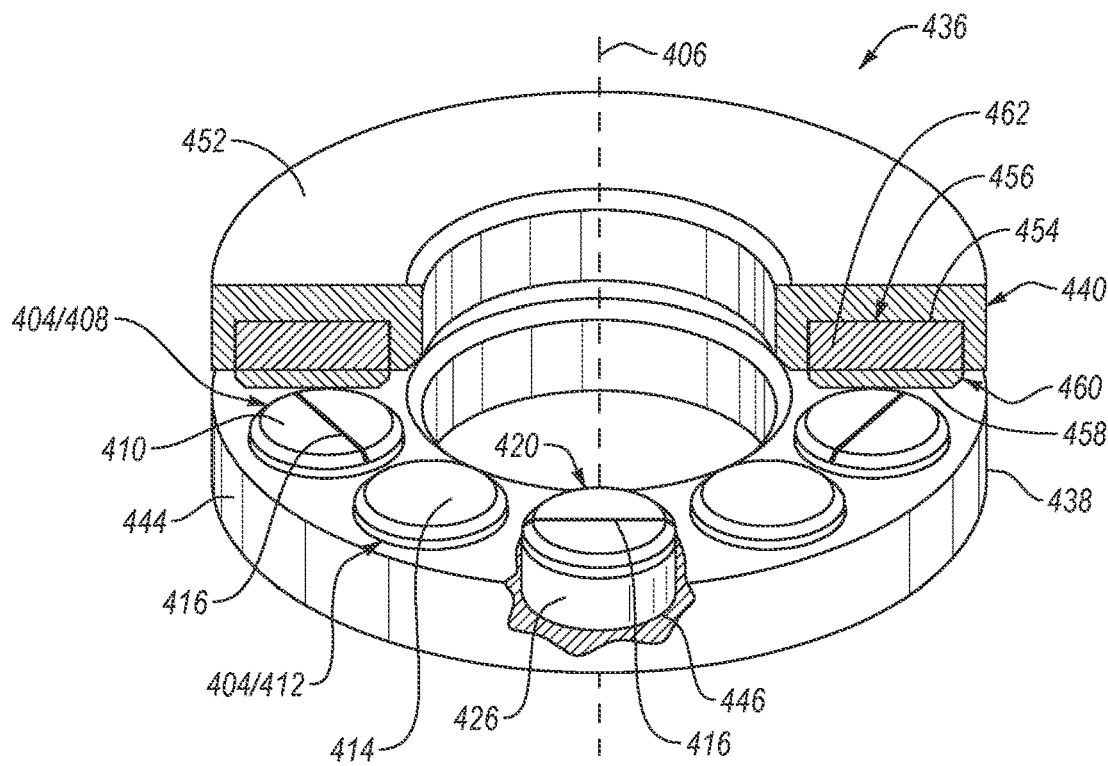
FIG. 4 is an isometric cutaway view of a thrust-bearing apparatus, according to an embodiment.

The concepts used in the radial bearing assemblies and apparatuses described herein may also be employed in thrust-bearing assemblies and apparatuses. FIG. 4 is an isometric cutaway view of a thrust-bearing apparatus 436, according to an embodiment. The thrust-bearing apparatus 436 includes a first bearing assembly 438 (e.g., rotor or stator) and a second bearing assembly 440 (e.g., the other of the rotor or stator).

The first bearing assembly 438 includes a first support ring 444. The first support ring 444 optionally includes a plurality of first recesses 446 that may be arranged in one or more row that extend generally circumferentially about a rotation axis 406. The first bearing assembly 438 also includes a plurality of PCD bearing element 404 mounted (e.g., brazed, press-fitted, etc.) thereto (e.g., at least partially positioned in a corresponding one of the first recesses 446). The first support ring 444 may be formed from any of the support ring materials disclosed herein.

The plurality of PCD bearing elements 404 includes at least one first PCD bearing element 408 having a first bearing surface 410 and at least one second PCD bearing element 412 having a second bearing surface 414. In an embodiment, the first and second bearing surfaces 410, 414 are at least substantially planar.

Except for the first bearing surface 410 being at least substantially planar, the first PCD bearing elements 408 may be the same as or similar to the first PCD bearing elements 108, 208 of FIGS. 1A, 1B, 2A, and 2B. For example, the first PCD bearing element 408 includes a first PCD table 420 bonded to a substrate 426. The first PCD table 420 may exhibit one or more of the magnetic properties, electrical properties, wear-resistances, or thermal stabilities as the first PCD bearing element 108 of FIGS. 1A-1B. Additionally, the first PCD table 420 includes at least one groove 416 formed in the first bearing surface 410 thereof.

Except for the second bearing surface 414 being at least substantially planar, the second PCD bearing element 412 may be the same as or similar to the second PCD bearing elements 112, 212 of FIGS. 1A, 1C, 2A, and 2C. For example, the second PCD bearing element 412 includes a second PCD table 428 bonded to a substrate (not shown). The second PCD table 428 may exhibit any of the magnetic properties (e.g., a coercivity that is less than and a specific magnetic saturation that is greater than the first PCD table 420), wear-resistances, or thermal stabilities as the second PCD bearing element 112 of FIGS. 1A and 1C. In an embodiment, the second bearing surface 414 does not include at least one groove formed therein.

The second bearing assembly 440 includes a second support ring 452. The second support ring 452 optionally includes a plurality of second recesses 454 in one or more rows that extend circumferentially about the rotation axis 406. The second bearing assembly 440 also includes a plurality of superhard bearing elements 456 mounted thereto. Each of the superhard bearing elements 456 includes a superhard bearing surface 458 that is substantially planar. The superhard bearing surface 458 is configured to contact and move relative to the first and second bearing surfaces 410, 414. In an embodiment, each of the superhard bearing elements includes a superhard table 460 and a substrate 462.

In an embodiment, the superhard bearing elements 456 are the same as or similar to the PCD bearing elements 404 of the first bearing assembly 438. For example, the superhard bearing elements 456 may include at least one PCD table that exhibits one or more of the magnetic properties, electrical properties, wear-resistances, and/or thermal stability characteristics of the first PCD table 120 of FIG. 1B. In such an example, the PCD table may include at least one groove formed in a bearing surface thereof. Similarly, the superhard bearing elements 456 may also include at least one other PCD table that exhibits one or more of the magnetic properties, electrical properties, wear-resistances, or thermal stabilities of the second PCD table 128 of FIG. 1C.

In an embodiment, at least one of the superhard bearing elements 456 may be different than at least one of the PCD bearing elements 404 of the first bearing assembly 438. For example, at least one of the superhard bearing elements 456 may not be similar to the first PCD bearing elements 408. In such an example, at least one of the superhard bearing elements 456 may be the same as or similar to the second PCD bearing elements 412. In another example, at least one of the superhard bearing elements 456 may not be similar to the second PCD bearing elements 412. In such an example, at least one of the superhard bearing elements 456 may be the same as or similar to the first PCD bearing elements 408. In another example, at least one of the superhard bearing elements 456 maybe substantially similar to the first PCD bearing elements 408 except that the at least one of the superhard bearing elements 456 does not include a groove formed in the superhard bearing surface 458 thereof. In another example, one or more of the superhard bearing elements 456 may be formed from any of the superhard materials disclosed herein.

The thrust-bearing apparatus 436 may be assembled and operated. For example, either the first or second bearing assembly 438, 440 (e.g., rotor) rotates relative to the other of the first or second bearing assembly 438, 440 (e.g., stator). Also during operation, lubrication, drilling fluid, mud, or some other fluid may be pumped between the shaft and the housing, and between the PCD bearing elements 404 and the superhard bearing elements 456. More particularly, rotation of the rotor at relatively high rotational speeds and/or low forces may sweep or cause the fluid onto/over PCD bearing elements 404 and superhard bearing elements 456 and may allow a fluid film (not shown) to develop between the PCD bearing elements 404 and superhard bearing elements 456.

Figure 5:
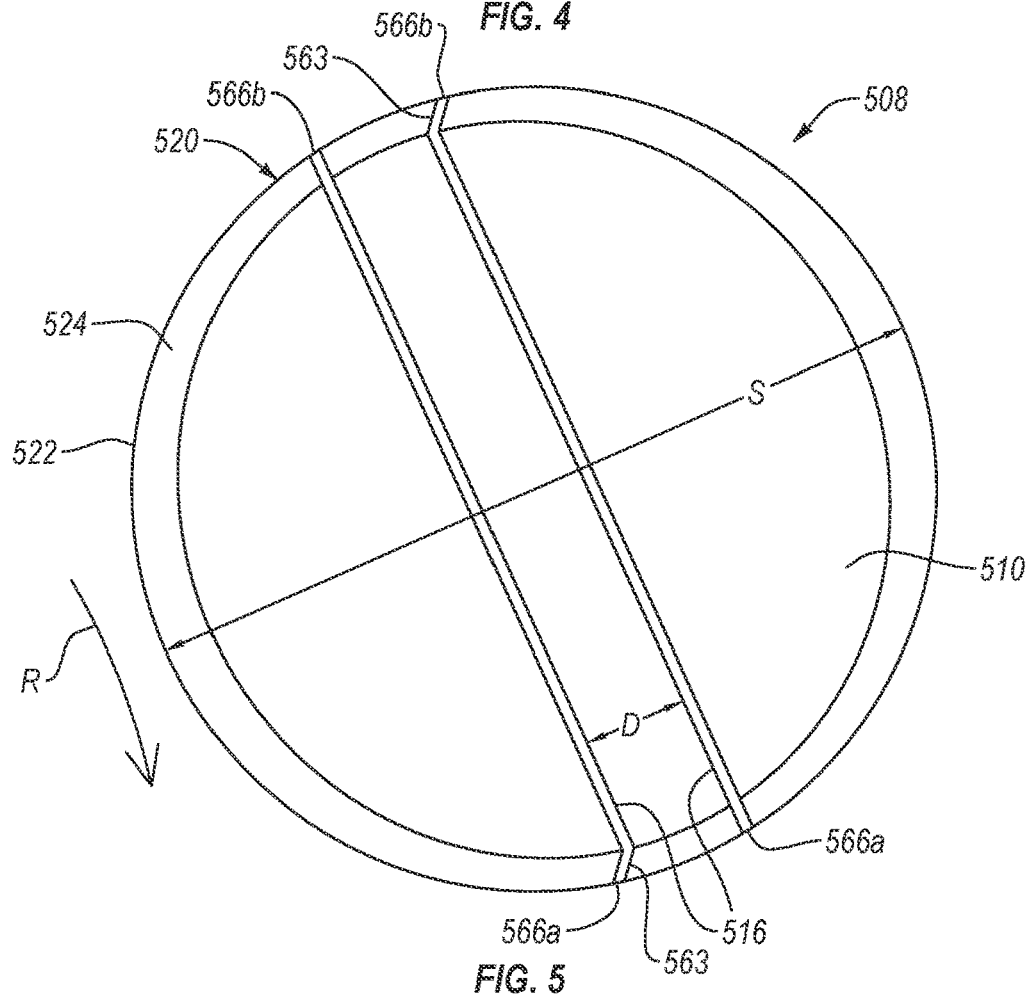
FIG. 5 is a top plan view of a first PCD bearing element that includes a plurality of grooves forming in a bearing surface thereof, according to an embodiment.

All of the first PCD bearing elements disclosed above are illustrated as having a single groove formed in a bearing surface thereof. However, any of the first PCD bearing elements disclosed herein may include two or more grooves formed in a bearing surface thereof. FIG. 5 is a top plan view of a first PCD bearing element 508 that includes a plurality of grooves 516 forming in a bearing surface 510 thereof. Except as otherwise disclosed herein, the first PCD bearing element 508 is the same as or similar to any of the first PCD bearing elements disclosed herein. For example, the first PCD bearing element 508 may represent a radial bearing element including a convex bearing surface (e.g., the first PCD bearing element 108 of FIGS. 1A-1B), a radial bearing element including a concave bearing surface (e.g., the first PCD bearing element 208 of FIGS. 2A-2B), or a thrust-bearing element exhibiting a substantially planar surface (e.g., first PCD bearing element 408 of FIG. 4). Additionally, the first PCD bearing element 508 may be used in any of the bearing assemblies or apparatuses disclosed herein.

The first PCD bearing element 508 includes a PCD table 520. The PCD table 520 includes a bearing surface 510, at least one lateral surface 522, and, optionally, a chamfer 524 extending between the between the bearing surface 510 and the lateral surface 522. It is noted that the bearing surface 510 may exhibit a convex curvature, a concave curvature, a substantially planar surface, or another suitable surface. The bearing surface 510 also includes a plurality of grooves 516 formed therein. In particular, the bearing surface 510 includes at least 2 grooves, at least 3 grooves, at least 4 grooves, at least 5 grooves, at least 6 grooves, at least 8 grooves, at least 10 grooves, 2 grooves to 4 grooves, 3 grooves to 5 grooves, or 4 grooves to 6 grooves, 5 grooves to 8 grooves, or 7 grooves to 10 grooves. In an example, each of the grooves 516 are illustrated as extending from a portion of the lateral surface 522, across the chamfer 524 and the bearing surface 510, to another portion of the lateral surface 522. In another example, at least one of the grooves 516 terminates at a location on the bearing surface 510 that is spaced from the chamfer 524 and/or the lateral surface 522. Terminating a groove 516 at a location of the bearing surface 510 may increase flow of the cooling fluid during use.

Forming the plurality of grooves 516 in the bearing surface 510 may reduce the compressive stresses of the PCD table 520 that facilitate crack formation at or near one of the grooves 516 and/or increase the surface area of the PCD table 520 (which may improve heat dissipation from the PCD table 520) than if only a single groove was formed in the bearing surface 510. In particular, the reduction of the compressive stresses of the PCD table 520, crack formation formed at or near one of the grooves 516, and/or the amount of heat dissipation from the PCD table 520 may depend on the distance "D" between the grooves 516. For example, the bearing surface 510 may exhibit span "S" (e.g., a diameter or lateral distance). In such an example, the distance "D" between the grooves 516 may be about 0.05 S to about 0.9 S, such as about 0.1 S to about 0.5 S, about 0.1 S to about 0.3 S, about 0.2 S to about 0.4 S, about 0.3 S to about 0.5 S, about 0.4 S to about 0.6 S, about 0.5 S to about 0.75 S, or about 0.7 S to about 0.9 S. In another example, the distance "D" between the grooves 516 may be about 0.5 mm to about 2 cm, such as about 1 mm to about 1 cm, about 0.5 mm to about 2 mm, about 1 mm to about 3 mm, about 2 mm to about 5 mm, about 2.5 mm to about 7.5 mm, about 5 mm to about 1 cm, about 7.5 mm to about 1.5 cm, or about 1 cm to about 2 cm. In an embodiment, the bearing surface 510 includes three or more grooves 516 formed therein and the distance "D" between each of the three or more grooves may be uniform or nonuniform (e.g., vary).

The first PCD bearing element 508 may be disposed in a bearing assembly that is configured to rotation in a direction R relative to an axis of rotation (e.g., axis 106 of FIG. 1A) and the grooves 516 may extend in a generally circumferential direction relative to the axis of rotation. However, in an embodiment, a fluid flowing through the bearing assembly may flow in a generally radial direction relative to the axis of rotation. To facilitate the flow of the fluid through the grooves 508, at least one of the grooves 516 may include one or more bent portions 563 at or near a lateral surface 522 of the first PCD bearing element 508. In an embodiment, at least one of the grooves 516 includes a bent portion 563 at an inlet 566a of the groove 516 (e.g., a portion of the groove 516 that receives the fluid when rotated in the direction R). In such an embodiment, the bent portion 563 may bend towards the axis of rotation relative to the rest of the groove 516. As such, the bent portion 563 causes more of the fluid to flow into the groove 516 when rotated in the direction R than if the groove 516 did not include the bent portion 563. In an embodiment, at least one of the grooves 516 includes a bent portion 563 at an outlet 566b of the groove 516 (e.g., a portion of the groove 516 that dispenses the fluid therefrom when rotated in the direction R). In such an embodiment, the bent portion 563 may bend away from the axis of rotation relative to the rest of the groove 516 which may facilitate fluid flow through the groove 516. It is noted that any of the grooves disclosed herein can include one or more bent portions.

In an embodiment, as shown in FIG. 5, one of the grooves 516 includes a bent portion 563 at the inlet 566a thereof and the other groove 516 includes bent portion 563 at the outlet 566b thereof. In an embodiment, at least two (e.g., all) of the grooves 516 includes a bent portion 563 at the inlet 566a thereof. In an embodiment, at least two (e.g., all) of the grooves 516 includes a bent portion 563 at the outlet 566b thereof. In an embodiment, at least one of the grooves 516 includes a bent portion 563 at an inlet 566a thereof and a bent portion 563 at an outlet thereof 566b.

FIGS. 6A-6D are cross-sectional views of a portion of a PCD table illustrating grooves having different cross-sectional geometries, according to different embodiments. Each of the cross-sections shown in FIGS. 6A-6D is taken across or transverse to a groove (e.g., substantially perpendicular to a longitudinal length of a groove) Except as otherwise disclosed herein, the grooves illustrated in FIGS. 6A-6D are the same as or similar to any of the other grooves disclosed herein. It is noted that the grooves illustrated in FIGS. 6A-6D may be embodiments of any of the grooves disclosed herein.

Figure 6A:
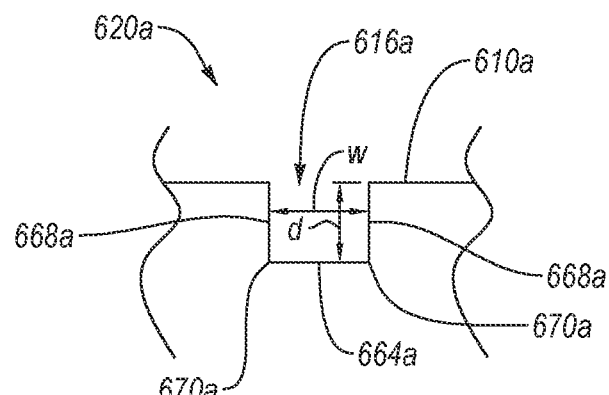
FIGS. 6A-6D are cross-sectional views of a portion of a PCD table illustrating grooves having different cross-sectional geometries, according to different embodiments.

Referring to FIG. 6A, the PCD table 620a includes a bearing surface 610a with a groove 616a formed therein. The groove 616a exhibits a generally partially rectangular cross-sectional geometry. For example, the groove 616a is defined by a bottommost surface 664a that is spaced from the bearing surface 610a and two lateral surfaces 668a that extend from the bottommost surface 664a to the bearing surface 610a. The two lateral surfaces 668a may be substantially perpendicular to the bottommost surface 664a.

The groove 616a exhibits a depth "d" measured perpendicularly from the first bearing surface 110 to the bottommost surface 664a. The depth "d" may be about 50 µm to about 500 µm, such as about 50 µm to about 150 µm, about 100 µm to about 250 µm, about 200 µm, to about 400 µm, or about 300 to about 500 µm. In some embodiments, the depth "d" may be greater than about 500 µm. In an embodiment, the PCD table 620a is leached before the groove 616a is formed. In such an embodiment, the depth "d" may be less than, equal to, or greater than a leached depth of the first PCD table 120.

The groove 616a exhibits a maximum width "w" that is measured between the two lateral surfaces 668a. The width "w" may be about 50 µm to about 500 µm, such as about 50 µm to about 150 µm, about 100 µm to about 250 µm, about 200 µm, to about 400 µm, or about 300 to about 500 µm. In some embodiments, the width "w" may be greater than about 500 µm. In an embodiment, the width "w" is greater than, less than, or substantially equal to the depth "d." For example, the width "w" may be less than about 0.1 d, about 0.1 d to about 0.3 d, about 0.2 d to about 0.4 d, about 0.3 d to about 0.5 d, about 0.4 d to about 0.6 d, about 0.5 d to about 0.7 d, about 0.6 d to about 0.8 d, about 0.7 d to about 0.9 d, about 0.8 d to about 1 d (i.e., about equal to d), about 0.9 d to about 1.25 d, about 1 d to about 1.5 d, about 1.25 d to about 1.75 d, about 1.5 d to about 2 d, about 1.75 d to about 2.5 d, about 2 d to about 3 d, about 2.5 d to about 4 d, about 3 d to about 5 d, about 4 d to about 6 d, about 5 d to about 7.5 d, about 7 d to about 10 d, or greater than 10 d.

The width "w" and the depth "d" may be selected to impart one or more selected characteristics of the first PCD table 620a. For example, increasing the depth "d" may increase the likelihood of crack formation at or near the groove 616a. However, increasing the depth "d" may also decrease the strength of the first PCD table 620a. In another example, increasing the width "w" may decrease the likelihood of crack formation at or near the groove 616. However, increasing the width "w" may decrease the adverse effect the groove 616a has on the strength of the first PCD table 620a.

The groove 616a may exhibit two corners 670a where the bottommost surface 664a meets the two lateral surfaces 668a. The corners 670a may act as stress concentrators. As such, crack formation may initial or terminate at or near one of the corners 670a or at both of the corners 670a. Such a configuration may cause the portions of the bearing surface 610a at or near the groove 616a to be substantially free of cracks which may improve the strength, toughness, wear-resistance, or visual appearance of the bearing surface 610a.

Figure 6B:
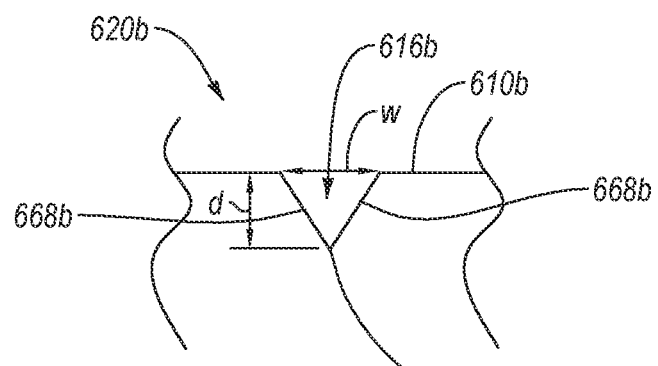

FIG. 6B illustrates a PCD table 620b that includes a bearing surface 610b and at least one groove 616b formed in the bearing surface 610b. The groove 616b exhibits a generally partial triangular cross-sectional geometry that is defined by two lateral surfaces 668b that extend from a bottommost portion 664b of the groove 616b towards the bearing surface 610. The groove 616b may exhibit a depth "d" and a width "w" that is the same as or similar to any of the same depths or widths as the groove 616a of FIG. 6A. The groove 616b includes a single corner 670b at the bottommost portion 664b. Similar to the corners 670a of FIG. 6A, the corner 670b may act as a stress concentrator. As such, crack formation may initiate or terminate at or near the corner 670b.

Figure 6C:
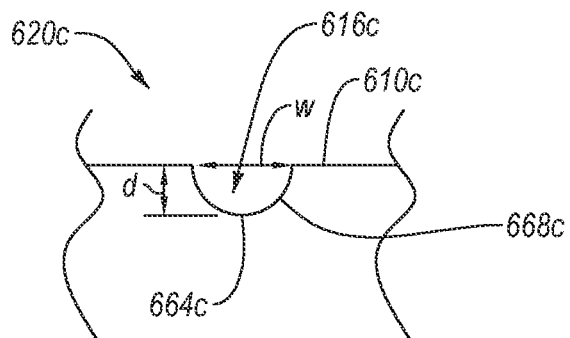

FIG. 6C illustrates a PCD table 620c that includes a bearing surface 610c and at least one groove 616c formed in the bearing surface 610c. The groove 616c exhibits a generally arcuate (e.g., semi-circular or other partially circular cross-sectional geometry) that is defined by an arcuate surface 668c. The groove 616c includes a bottommost portion 664c that is furthest spaced from the bearing surface 610c. The groove 616c may exhibit a depth "d" and a width "w" that is the same as or similar to any of the same depths or widths as the groove 616a of FIG. 6A. The groove 616c may be less likely to initiate a crack than the grooves 616a, 616b of FIGS. 6A-6B because the groove 616c does not include a corner. However, the groove 616c may have a small adverse effect on the overall toughness of the PCD table 620 since the groove 616c does not include a corner.

Figure 6D:
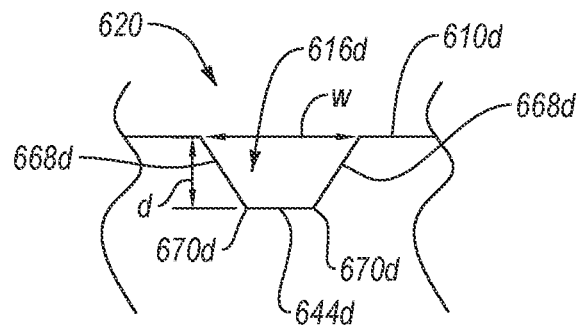

FIG. 6D illustrates a PCD table 620d that includes a bearing surface 610d and at least one groove 616d formed in the bearing surface 610c. The groove 616d exhibits a generally trapezoidal cross-sectional geometry that is defined by a bottommost surface 664d and two lateral surfaces 668d that extend from a bottommost surface 644d of the groove 616d towards the bearing surface 610. The groove 616d may exhibit a depth "d" and a width "w" that is the same as or similar to any of the same depths or widths as the groove 616a of FIG. 6A. The groove 616d includes two corners 670d at the intersection between the bottommost surface 664d and the two side walls 668d. Similar to the corners 670a of FIG. 6A, the corner 670d may act as a stress concentrator. As such, crack formation may initiate or terminate at or near the corner 670b.

The grooves shown in FIGS. 6A-6D may be formed using any suitable method. For example, the grooves shown in FIGS. 6A-6D may be formed by grinding, lapping, electrical discharge machining (e.g., wire electrical discharge machining), laser machining, or any suitable method. Examples of methods of forming grooves are disclosed in U.S. Provisional Patent Application No. 62/279,271, the disclosure of which is incorporated herein, in its entirety, by this reference. More generally, any of the bearing elements disclosed herein may be formed from two or more bearing segments that are brazed together in a support to form a bearing element of a large segment shape with one or more seams formed between the bearing segments. For example, in an embodiment, the seams may be formed by forming two substantially semi-cylindrical bearing elements and brazing such semi-cylindrical bearing elements together in the support ring to form a substantially cylindrical bearing element with a seam therein and having a substantially planar bearing surface. After brazing the bearing segments to the support ring, the bearing elements so formed may be machined (e.g. electrical discharge machining, laser machining, grinding, water jet machining, or combinations thereof) to form a convex or concave radial bearing surface.

Figure 7A:
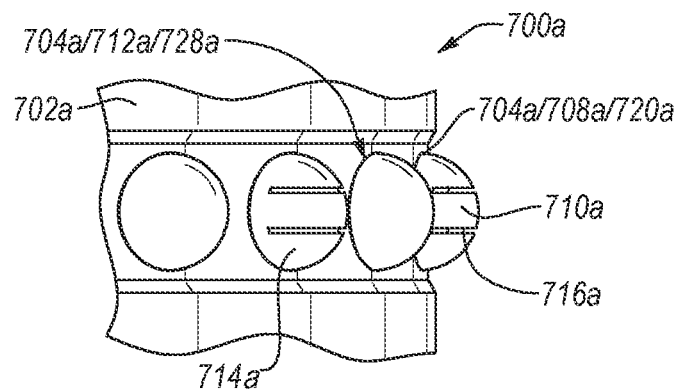
FIG. 7A is a partial isometric view of a first radial bearing assembly that includes a plurality of convex PCD bearing elements, according to an embodiment.

FIG. 7A is a partial isometric view of a first radial bearing assembly 700a (e.g., inner race) that includes a plurality of convex PCD bearing elements 704a, according to an embodiment. For example, the first radial bearing assembly 700a includes a support ring 702a that defines a plurality of recesses (not shown, obscured). The support ring 702a may be formed from any of the support ring materials disclosed herein. The plurality of convex PCD bearing element 704a are at least partially disposed in a corresponding one of the plurality of recesses.

The convex PCD bearing elements 704a include at least one first convex PCD bearing element 708a and at least one second convex PCD bearing element 712a. The first PCD convex bearing element 708a includes a first convex PCD table 720a exhibiting a first convex bearing surface 710a. The second PCD convex bearing element 712a includes a second convex PCD table 728a exhibiting a second convex bearing surface 714a. Each of the first and second convex bearing surfaces 710a, 714a may exhibit at least a convex curvature and a circumferential direction relative to an axis of rotation (not shown). For example, the first and second convex bearing surfaces 710a, 714a may exhibit a generally spherical or cylindrical shape.

Except for its geometry (e.g., the curvature of the first convex bearing surface 710a), the first convex PCD bearing element 708a may be the same as or similar to any of the first PCD bearing elements disclosed herein. For example, the first convex PCD table 720a may exhibit any of the magnetic properties, electrical properties, wear resistances, thermal stabilities, or any other property as any of the first PCD tables disclosed herein. Additionally, the first convex PCD table 720a may define at least one groove 716a, such as two grooves 716a.

Except for its geometry (e.g., the curvature of the second convex bearing surface 714a), the second convex PCD bearing element 712a may be the same as or similar to any of the second PCD bearing elements disclosed herein. For example, the second convex PCD table 728a may exhibiting any of the magnetic properties, electrical properties, wear resistances, thermal stabilities, or any other property as any of the second PCD table disclosed herein. For instance, the second convex PCD table 728a may exhibit a coercivity that is less than and a specific magnetic saturation that is greater than the first convex PCD table 720a. The second convex PCD table 728a may not include any grooves formed therein.

Figure 7B:
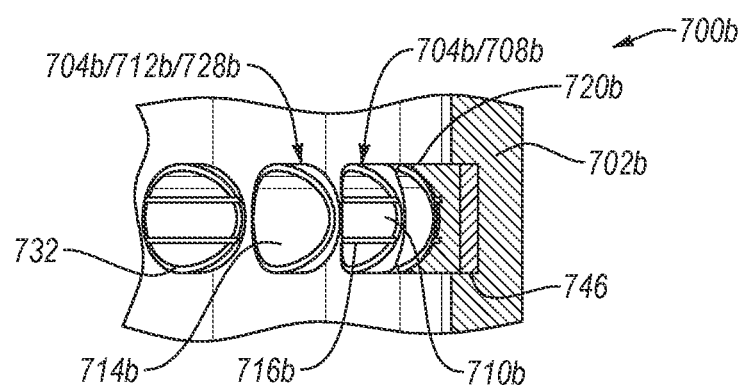
FIG. 7B is an isometric cutaway view of a second radial bearing assembly that includes a plurality of concave PCD bearing elements, according to an embodiment.

In an embodiment, the first radial bearing assembly 700a may form part of a radial bearing apparatus that includes an outer race that is configured to at least partially contact the first radial bearing assembly 700a during use. FIG. 7B is an isometric cutaway view of a second radial bearing assembly 700b (e.g., outer race) that includes a plurality of concave PCD bearing elements 704b, according to an embodiment. For example, the first radial bearing assembly 700a (e.g., rotor) can be received concentrically by the second radial bearing assembly 700b (e.g., stator). The second radial bearing assembly 700b may include a support ring 702b that defines a plurality of recesses 746. The support ring 702b may be formed from any of the support ring materials disclosed herein. In an embodiment, the plurality of concave PCD bearing element 704b may be at least partially disposed in a corresponding one of the plurality of recesses 746.

The concave PCD bearing elements 704b includes at least one first concave PCD bearing element 708b and a second concave PCD bearing element 712b. The first concave PCD bearing element 708b includes a first concave PCD table 720b exhibiting a first concave bearing surface 710b. The second concave PCD bearing element 712b includes a second concave PCD table 728b exhibiting a second concave bearing surface 714b. In an embodiment, each of the first and second concave bearing surfaces 710b, 714b may exhibit a spherical curvature. In an embodiment, each of the first and second concave bearing surfaces 710b, 714b exhibits a concave curvature in a circumferential direction only, similar to the concave bearing surfaces 210, 214 of FIG. 2A. Both the first and second concave PCD bearing elements 708b, 712b may include a chamfer 732.

The first concave PCD bearing element 708b may be the same as or similar to any of the first PCD bearing elements disclosed herein. For example, the first concave PCD table 720b may exhibit any of the magnetic properties, electrical properties, wear resistances, etc. as any of the first PCD tables disclosed herein. Additionally, the first concave PCD table 720b may define at least one groove 716b, such as two grooves 716b.

The second concave PCD bearing element 712b may be the same as or similar to any of the second PCD bearing elements disclosed herein. For example, the second concave PCD table 728b may exhibiting any of the magnetic properties, electrical properties, wear resistances, etc. as any of the second PCD table disclosed herein. For instance, the second concave PCD table 728b may exhibit a coercivity that is less than and a specific magnetic saturation that is greater than the first concave PCD table 720b. The second concave PCD table 728b may not include any grooves formed therein.

As previously discussed, the first radial bearing assembly 700a of FIG. 7A and the second radial bearing assembly 700b of FIG. 7B may form a radial bearing apparatus (not shown). In operation, rotation of a shaft (not shown) secured to the first radial bearing assembly 700a may rotate the first radial bearing assembly 700a relative to the second radial bearing assembly 700b. Drilling fluid, lubrication, or other fluid may be pumped between or in contact with the first and second convex bearing surfaces 710a, 714a and the first and second concave superhard bearing surfaces 710b, 714b. In an embodiment, at relatively high rotational speeds, a fluid film or partial fluid film may at least partially develop between the first and second convex bearing surfaces 710a, 714a and the first and second concave superhard bearing surfaces 710b, 714b and may develop sufficient pressure to maintain the first and second convex bearing surfaces 710a, 714a and the first and second concave superhard bearing surfaces 710b, 714b apart from each other. At relatively low rotational speeds, the first and second convex bearing surfaces 710a, 714a and the first and second concave superhard bearing surfaces 710b, 714b contact each other.

The principles disclosed herein may also be used with tilting pad bearing elements and/or continuous bearing elements. Examples of tilting pad bearing elements and continuous bearing elements are disclosed in U.S. Pat. Nos. 8,545,104 and 8,746,979, the disclosure of each of which is incorporated herein, in its entireties, by this reference.

Figure 8:
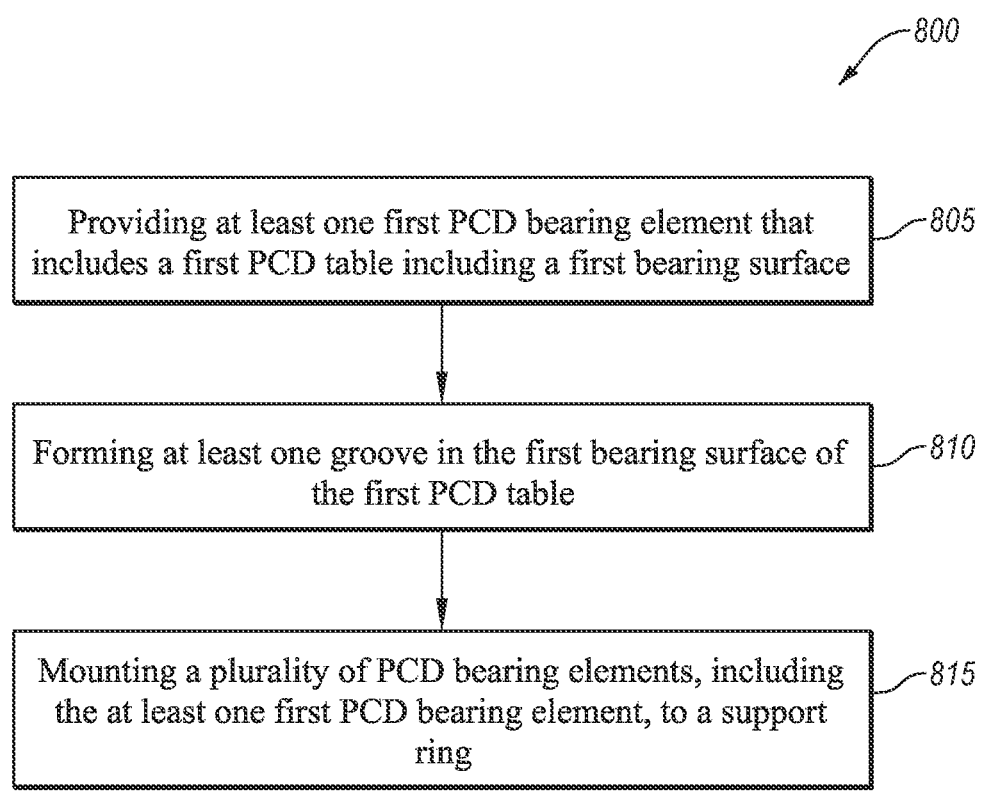
FIG. 8 is a flow chart of a method of forming any of the bearing assemblies disclosed herein, according to an embodiment.

FIG. 8 is a flow chart of a method 800 of forming any of the bearing assemblies disclosed herein, according to an embodiment. The method 800 includes acts 805, 810, and 815. In an embodiment, acts 805, 810, and 815 may be performed in a different order than the order disclosed herein. In an embodiment, at least one of the acts 805, 810, or 815 may be eliminated, supplemented, divided into additional act, or combined together. In an embodiment, as will be discussed in more detail below, the method 800 may include one or more additional acts.

Act 805 includes providing at least one first PCD bearing element that includes a first PCD table including a first bearing surface. At least a portion (e.g., an unleached portion) of the first PCD table exhibits one or more of a coercivity of about 125 Oe or more, a specific magnetic saturation of about G·cm$^3$/g or less, or an electrical conductivity of less than 1200 S/m.

In an embodiment, act 805 includes selecting at least one first PCD bearing element from a plurality of PCD bearing elements. For example, the PCD bearing elements may have been initially formed as cutting elements but, for one reason or another, were rejected as cutting elements. In such an example, the PCD bearing elements may have been formed using different diamond particle sizes, different diamond particle distributions, different cell pressures, etc. As such, the plurality of PCD bearing element may include at least one first PCD bearing element (e.g., a PCD bearing element exhibiting a coercivity of about 125 Oe or more and a specific magnetic saturation of about 14 G·cm$^3$/g or less) and at least one second PCD bearing element (e.g., a PCD bearing element exhibiting a coercivity that is less than and a specific magnetic saturation that is greater than the first PCD bearing element). Therefore, act 805 may include measuring at least one property or characterizing a PCD bearing element using any of the characterization techniques disclosed herein to determine if the PCD bearing element removed from the container is, in fact, a first PCD bearing element (e.g., magnetic or electrical impedance testing).

Act 810 includes forming at least one groove in the first bearing surface of the first PCD table. For example, act 810 may include forming any one or more of the grooves disclosed herein in the first bearing surface. For example, act 810 may include forming a single groove or a plurality of grooves in the first bearing surface.

In an embodiment, act 810 includes laser machining the first bearing surface to form the at least one groove. For example, act 810 may include laser machining the first bearing surface using any of the laser cutting techniques disclosed in U.S. Pat. No. 9,062,505, the disclosure of which is incorporated herein, in its entirety, by this reference. In an embodiment, act 810 includes forming the at least one groove by lapping, grinding, electric discharge machining, or any other suitable method.

Act 815 includes mounting a plurality of PCD bearing elements, including the at least one first PCD bearing element, to a support ring. Optionally, act 815 may be performed after act 810. For example, act 815 may include brazing the plurality of PCD bearing elements to the support ring. In such an example, act 815 may include forming one or more cracks in the first PCD table. However, the cracks may be located at, within, or near the groove because the groove acts as a crack initiation site. In another example, act 815 may include press fitting or otherwise mounting the plurality of PCD bearing elements to the support ring.

In an embodiment, the method 800 may further include the act of forming the at least one first PCD bearing element using any of the processes disclosed herein. For example, the method 800 may include forming the first PCD bearing element in an HPHT process exhibiting a cell pressure that is greater than 7.5 GPa.

In an embodiment, method 800 may further include the act of providing at least one second PCD bearing element that includes a second PCD table including a second bearing surface. At least a portion of the second PCD table may exhibit a coercivity that is less than and a specific magnetic saturation that is greater than the first PCD table. In an embodiment, the act of providing the second PCD bearing element includes providing the second PCD bearing element from a plurality of PCD bearing elements. The act of providing the second PCD bearing element may include measuring at least one property of or characterizing a PCD bearing element to verify that it is a second PCD bearing element. In an embodiment, the plurality of bearing elements of act 815 may include at least one second PCD bearing element.

In an embodiment, the method 800 may optionally include the act of forming the at least one second PCD bearing element using any of the processes disclosed herein.

Figure 9:
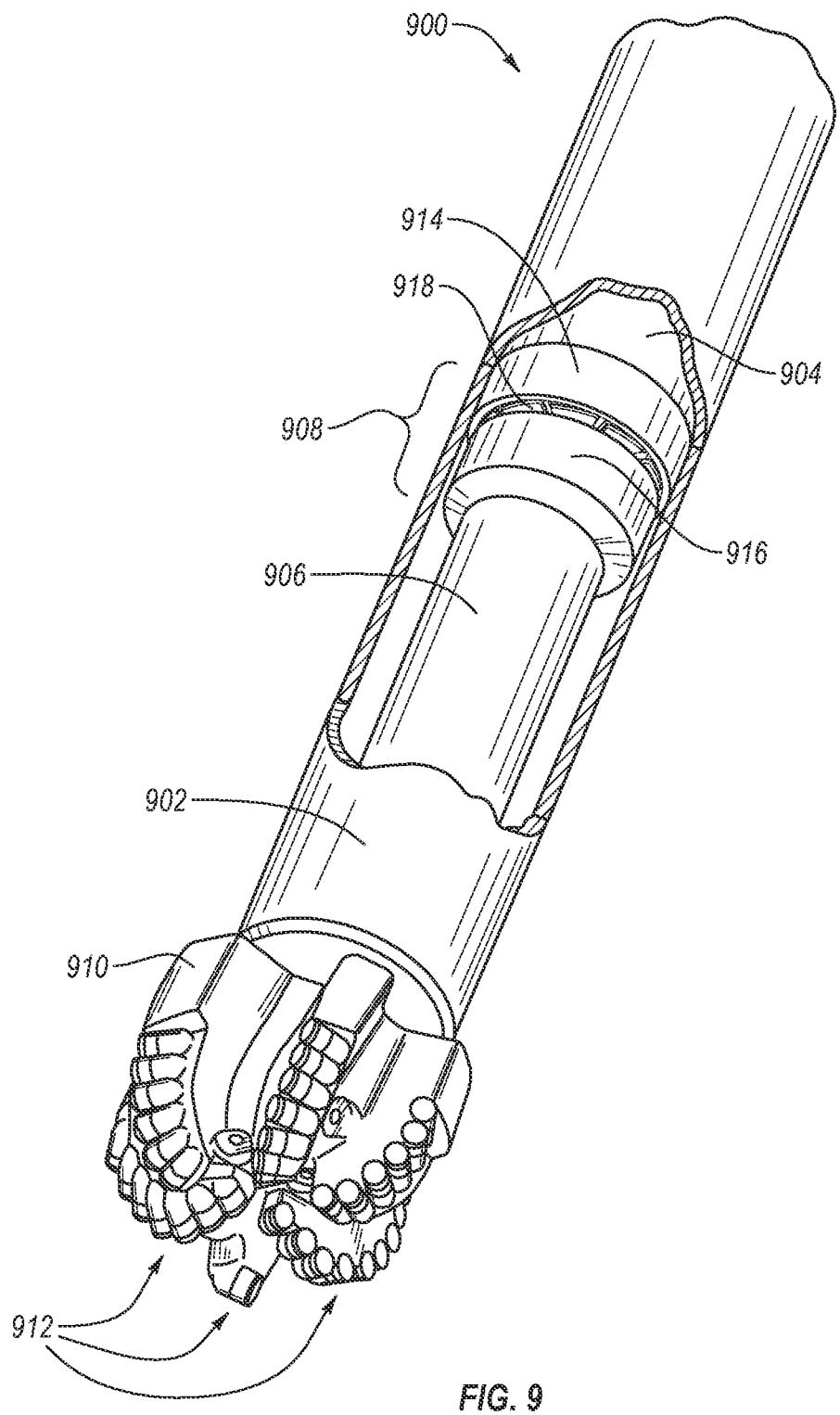
FIG. 9 is a schematic isometric cutaway view of an embodiment of a subterranean drilling system that uses any of the bearing apparatuses disclosed herein, according to an embodiment.

Any of the embodiments for bearing apparatuses discussed above may be used in a subterranean drilling system. FIG. 9 is a schematic isometric cutaway view of an embodiment of a subterranean drilling system 900 that uses any of the bearing apparatuses disclosed herein, according to an embodiment. The subterranean drilling system 900 includes a housing 902 enclosing a downhole drilling motor 904 (i.e., a motor, turbine, or any other device capable of rotating an output shaft) that is operably connected to an output shaft 906. A rotary drill bit 910 configured to engage a subterranean formation and drill a borehole is connected to the output shaft 906. The rotary drill bit 910 is shown as so-called "fixed cutter" drill bit including a plurality of blades having a plurality of PDC cutting elements 912 mounted thereon. However, in other embodiments, the rotary drill bit 910 may be configured as a roller cone bit including a plurality of roller cones.

A thrust-bearing apparatus 908, including PCD bearing elements 918, is operably coupled to the downhole drilling motor 904. The thrust-bearing apparatus 908 may be configured as any of the previously described thrust-bearing apparatus embodiments. The thrust-bearing apparatus 908 includes a stator 914 that does not rotate and a rotor 916 that is attached to the output shaft 906 and rotates with the output shaft 906. A radial bearing apparatus (not shown) may also be coupled to the downhole drilling motor 904. The thrust-bearing apparatus 908 may be the same as or substantially similar to the thrust-bearing apparatus 436 of FIG. 4 and the radial bearing apparatus may be the same as or substantially similar to the radial bearing apparatus 336 of FIG. 3.

In operation, drilling fluid may be circulated through the downhole drilling motor 904 to generate torque and effect rotation of the output shaft 906 and the rotary drill bit 910 attached thereto so that a borehole may be drilled. A portion of the drilling fluid is also used to lubricate opposing bearing surfaces, such as the opposing bearing surfaces of the stator 914 and rotor 916. As the borehole is drilled, pipe sections may be connected to the subterranean drilling system 900 to form a drill string capable of progressively drilling the borehole to a greater depth within the earth.

While various aspects and embodiments have been disclosed herein, other aspects and embodiments are contemplated. The various aspects and embodiments disclosed herein are for purposes of illustration and are not intended to be limiting. Additionally, the words "including," having," and variants thereof (e.g., "includes" and "has") as used herein, including the claims, shall be open-ended and have the same meaning as the word "comprising" and variants thereof (e.g., "comprise" and "comprises").

We claim:

1. A method of manufacturing a bearing assembly, the method comprising:
sintering a plurality of polycrystalline diamond ("PCD") bearing elements, each having a table, the table defining a bearing surface of each of the plurality of PCD bearing elements;
selecting a characteristic of the sintering such that, after the sintering, at least a portion of the table exhibits at least one of a coercivity of about 125 Oersteds ("Oe") or more, a specific magnetic saturation of about 14 Gauss·cm$^3$/grams ("G·cm$^3$/g") or less, or an electrical conductivity of less than 1200 siemens per meter ("S/m");
sintering another plurality of additional PCD bearing elements, each having an associated table, wherein at least a portion of the associated table exhibits a specific magnetic saturation or an electrical conductivity that is greater than the tables of the plurality of PCD bearing elements;
mounting the plurality of PCD bearing elements and the another plurality of additional PCD bearing elements to a support ring such that the bearing surface of each of the plurality of PCD bearing elements and the another plurality of additional PCD bearing elements collectively define a bearing surface to be placed in contact with an opposing bearing surface of a second support ring; and positioning each PCD bearing element of the plurality of PCD bearing elements between PCD bearing elements of the another plurality of PCD bearing elements.

2. The method of claim 1, wherein selecting the characteristic of the sintering comprises selecting at least one of a pressure or a temperature of the sintering.

3. The method of claim 2, wherein sintering the plurality of PCD bearing elements comprises pressurizing the tables of the plurality of PCD bearing elements at 7.5 GPa to 15 GPa.

4. The method of claim 2, wherein sintering the plurality of PCD bearing elements comprises exposing the tables of the plurality of PCD bearing elements to a temperature between 1100° C. and 2200° C.

5. The method of claim 1, further comprising selecting the coercivity the tables of the plurality of PCD bearing elements to be less than 250 Oe.

6. The method of claim 1, further comprising selecting the associated tables of the another plurality PCD bearing elements to exhibit the specific magnetic saturation that is greater than 15 G·cm³/g.

7. The method of claim 6, further comprising defining at least one groove in the table defining the bearing surface of each of the plurality of PCD bearing elements.

8. The method of claim 7, further comprising forming a second bearing surface defined by each of the associated tables to not include a groove.

9. The method of claim 1, further comprising at least one of:
selecting the coercivity of the table to be 140 Oe to 175 Oe;
selecting the specific magnetic saturation of the table to be 9 G·cm³/g to 12 G·cm³/g; or
selecting the electrical conductivity to be 5 S/m to about 1000 S/m.

10. The method of claim 1, further comprising brazing the plurality of PCD bearing elements to the support ring.

11. A bearing assembly formed by the method according to claim 1.

12. A method of manufacturing a bearing assembly, the method comprising:
sintering a plurality of polycrystalline diamond ("PCD") bearing elements, each of the plurality of PCD bearing elements comprising a table defining a bearing surface of each of the plurality of PCD bearing elements;
pressurizing the plurality of PCD bearing elements during the sintering such that at least a portion of the table of each of the plurality of PCD bearing elements exhibits at least one of a coercivity of about 125 Oersteds ("Oe") or more, a specific magnetic saturation of about 14 Gauss·cm³/grams ("G·cm³/g") or less, or an electrical conductivity of less than 1200 siemens per meter ("S/m");
sintering a second plurality of PCD bearing elements, each of the second plurality of PCD bearing elements comprising a table, such that the each of the second plurality of PCD bearing elements exhibit a specific magnetic saturation or an electrical conductivity that is greater than the plurality of PCD bearing elements;
mounting the plurality of PCD bearing elements to a first support ring and a second support ring;
mounting the second plurality of PCD bearing elements to the first support ring and the second support ring at locations between the plurality of PCD bearing elements; and
positioning the second support ring at least partially within the first support ring such that at least some of the plurality of PCD bearing elements bear upon each other.

13. The method of claim 12, further comprising selecting the coercivity the tables of the PCD bearing elements to be less than 250 Oe.

14. The method of claim 12, further comprising defining the bearing surfaces of the tables mounted to the first support ring to exhibit a concave surface.

15. The method of claim 13, further comprising defining the bearing surfaces of the tables mounted to the first support ring to exhibit a convex surface.

16. The method of claim 12, further comprising pressurizing the tables during the sintering to a pressure between 7.5 GPa and 15 GPa.

17. A bearing assembly formed by the method according to claim 12.

18. A method of forming a bearing assembly, the method comprising:
selecting a plurality of polycrystalline diamond ("PCD") bearing elements that each include a PCD table including a bearing surface;
wherein at least a portion of the PCD table exhibits at least one of:
a coercivity of 125 Oersteds ("Oe") or more;
a specific magnetic saturation of about 14 Gauss·cm³/grams ("G·cm³/g") or less; or
an electrical conductivity of less than 1200 siemens per meter ("S/m");
selecting another plurality of PCD bearing elements, the another plurality of PCD bearing elements each comprising a second PCD table, wherein the second PCD table exhibits a specific magnetic saturation or an electrical conductivity that is greater than the PCD table; and
mounting the plurality of PCD bearing elements to a support ring, each of the plurality of PCD bearing elements positioned between bearing elements of the another plurality of PCD bearing elements.

19. The method of claim 18, further comprising forming at least one groove in the bearing surface of the PCD table.

20. The method of claim 18, further comprising:
producing at least a portion of the second PCD table to exhibit a coercivity of about 115 Oe or less.

21. A bearing assembly formed by the method according to claim 18.

* * * * *